(12) United States Patent
Kamioka et al.

(10) Patent No.: US 8,019,512 B2
(45) Date of Patent: Sep. 13, 2011

(54) SYSTEM FOR ADJUSTING DIRECTION OF OPTICAL AXIS OF HEADLIGHT

(75) Inventors: Takahiro Kamioka, Kariya (JP); Yasutoshi Horii, Nagoya (JP); Junichi Hasegawa, Kariya (JP)

(73) Assignee: Denso Corporation, Kariya (JP)

( * ) Notice: Subject to any disclaimer, the term of this patent is extended or adjusted under 35 U.S.C. 154(b) by 856 days.

(21) Appl. No.: 12/074,219

(22) Filed: Feb. 29, 2008

(65) Prior Publication Data

US 2009/0043458 A1    Feb. 12, 2009

(30) Foreign Application Priority Data

Mar. 1, 2007   (JP) .................................. 2007-051982
Jun. 12, 2007   (JP) .................................. 2007-155269

(51) Int. Cl.
*G06F 19/00* (2006.01)
(52) U.S. Cl. ............... 701/49; 701/36; 701/96; 701/300
(58) Field of Classification Search .................... 701/36, 701/29, 48, 49, 300, 93, 96; 315/82, 149; 250/208.1

See application file for complete search history.

(56) References Cited

U.S. PATENT DOCUMENTS

| 6,343,869 B1 | 2/2002 | Kobayashi |
| 6,429,594 B1 | 8/2002 | Stam et al. |
| 6,861,809 B2 | 3/2005 | Stam |
| 6,949,882 B2 * | 9/2005 | Suyama et al. ................. 315/77 |

FOREIGN PATENT DOCUMENTS

| EP | 1 142 757 | 9/2004 |
| JP | 08-040140 | 2/1996 |
| JP | 10-175478 | 6/1998 |
| JP | 11-208366 | 8/1999 |
| JP | 2001-277938 | 10/2001 |
| JP | 2003-335171 | 11/2003 |
| JP | 2004-500279 | 1/2004 |
| JP | 2004-352246 | 12/2004 |
| WO | 2006-295601 | 10/1994 |
| WO | WO 01/70538 | 9/2001 |

OTHER PUBLICATIONS

Office action dated Jan. 6, 2009 in Japanese Application No. 2007-155269.
Office action dated Dec. 15, 2009 in corresponding German Application No. 10 2008 012327.7.

* cited by examiner

*Primary Examiner* — Richard M. Camby
(74) *Attorney, Agent, or Firm* — Harness, Dickey & Pierce, PLC

(57) ABSTRACT

In a system for controlling a headlight of a vehicle to be controlled, a distance detector detects a distance between the controlled vehicle and an other vehicle ahead thereof. A determiner determines a first target direction for an optical axis of the headlight in a vertical direction when it is assumed that the optical axis of the headlight passes through a target located at the detected distance with respect to the controlled vehicle. The target has a predetermined height above a predetermined reference point. The predetermined height of the target is unchanged irrespective of change in the detected distance. A first adjuster adjusts the direction of the optical axis of the headlight in the vertical direction so that the direction of the optical axis is matched with the determined first target direction.

10 Claims, 10 Drawing Sheets

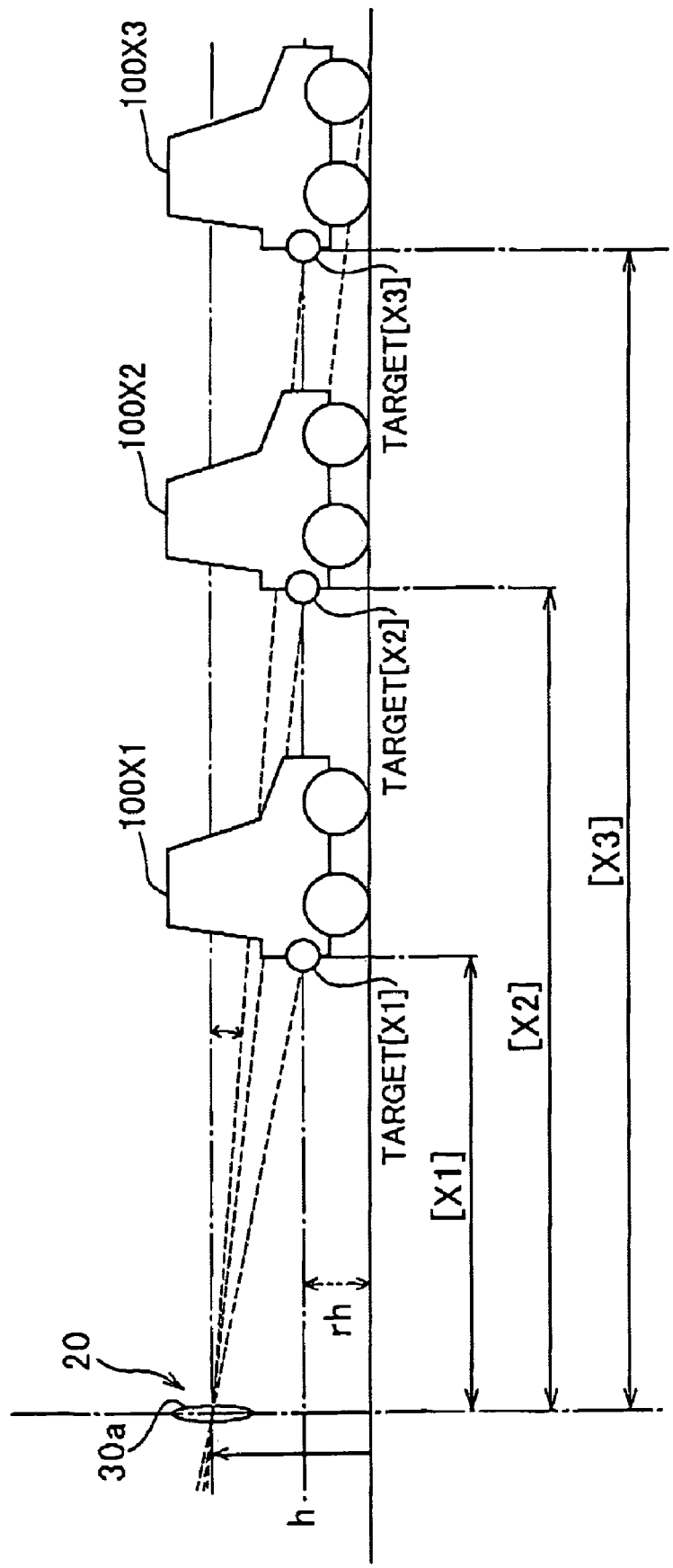

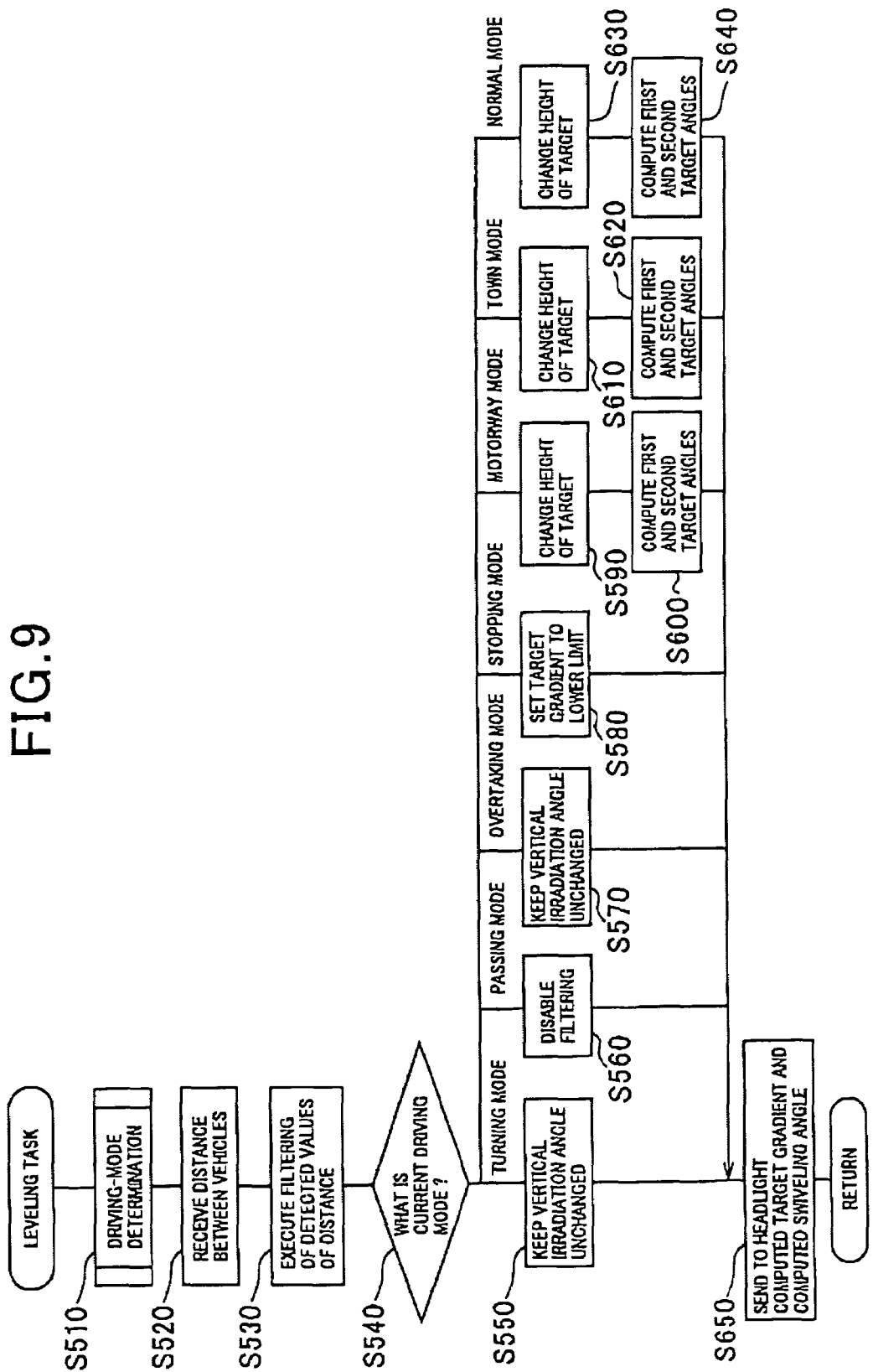

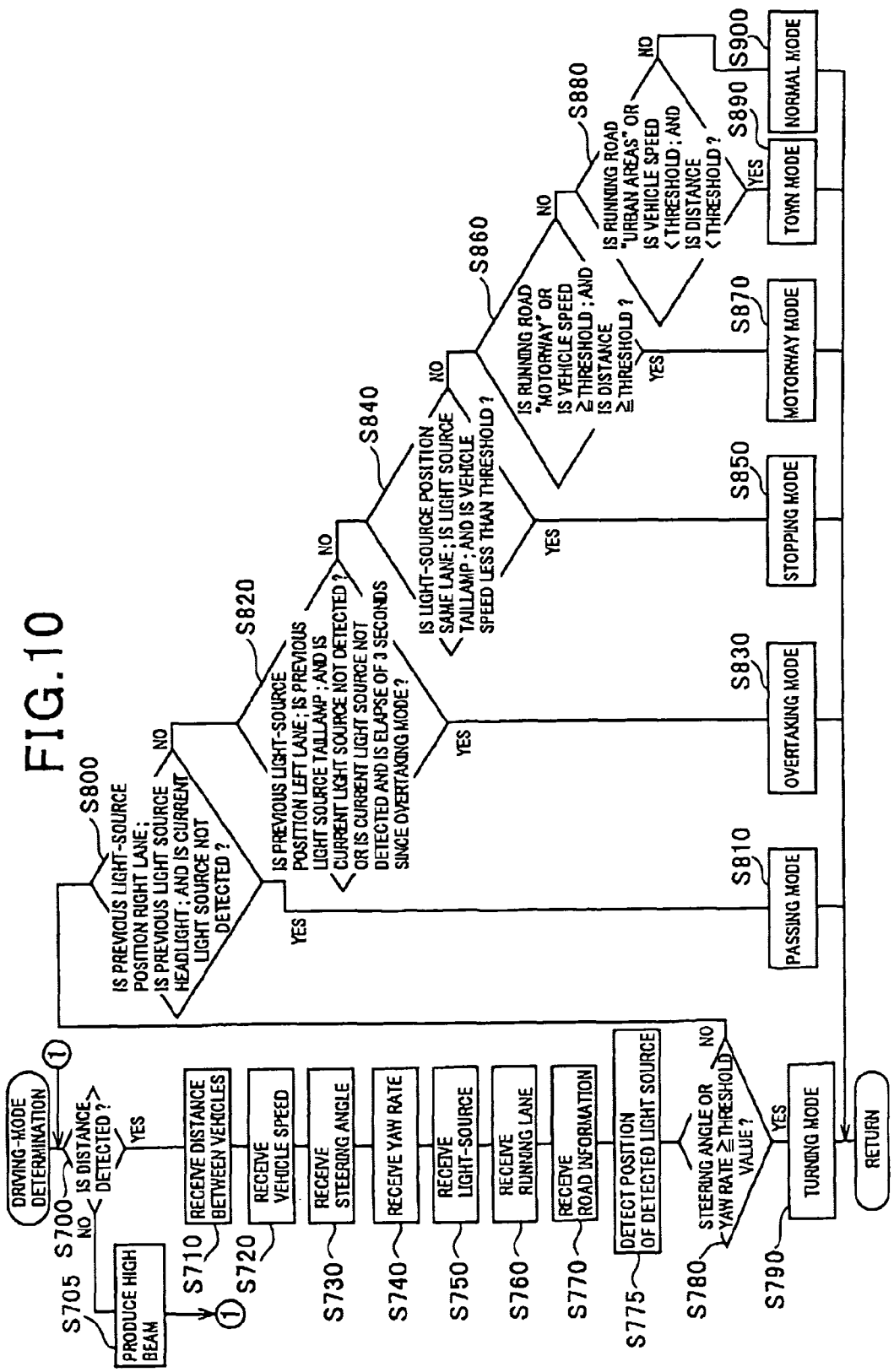

SYSTEM FOR ADJUSTING DIRECTION OF OPTICAL AXIS OF HEADLIGHT

CROSS REFERENCE TO RELATED APPLICATIONS

This application is based on Japanese Patent Applications 2007-51982 and 2007-155269 filed on Mar. 1, 2007 and Jun. 12, 2007, respectively. This application claims the benefit of priority from the Japanese Patent Applications, so that the descriptions of which are all incorporated herein by reference.

FIELD OF THE INVENTION

The present invention relates to systems for automatically adjusting the direction of a beam irradiated by headlights of a vehicle.

BACKGROUND OF THE INVENTION

Systems for automatically controlling the direction of a beam produced by a headlight of a vehicle to be controlled are important to provide adequate light for the driver without dazzling other persons, such as the driver of a proceeding vehicle that the controlled vehicle follows.

An example of such control systems is disclosed in WO 2001/070538.

The control system disclosed in the WO publication is configured to control the direction of a beam produced by a headlight of a vehicle to be controlled on the basis of the distance of a preceding vehicle relation to the controlled vehicle.

Specifically, when the distance of the preceding vehicle with respect to the controlled vehicle becomes short, the control system is configured to change the direction of the beam downward. On the other hand, when the distance of the preceding vehicle with respect to the controlled vehicle becomes long, the control system is configured to change the direction of the beam upward.

The WO publication however may not sufficiently describe definite algorithms for changing the direction of the beam upward and downward.

Thus, the control system disclosed in the WO publication may change the direction of the beam excessively upward depending on the increase in the distance of the preceding vehicle with respect to the controlled vehicle; this may dazzle the driver of the leading vehicle.

The control system disclosed in the WO publication may also change the direction of the beam excessively downward depending on the reduction in the distance of the preceding vehicle with respect to the controlled vehicle; this may cause an unirradiated region between the preceding vehicle and an irradiated field of the beam. The unirradiated region may have poor viewability for the driver of the controlled vehicle due to low light.

SUMMARY OF THE INVENTION

In view of the circumstances set force above, an object of an aspect of the present invention is to provide systems for automatically adjusting the direction of a beam irradiated by a headlight of a vehicle to be controlled; these systems are designed to properly execute the beam-direction adjustment without dazzling the driver of another vehicle in front of the controlled vehicle and/or without causing an irradiated region between another vehicle in front of the controlled vehicle and an irradiated field of the beam.

According to one aspect of the present invention, there is provided a system for controlling a headlight of a vehicle to be controlled. The system includes a distance detector configured to detect a distance between the controlled vehicle and another vehicle ahead thereof, and a determiner configured to determine a first target direction for an optical axis of the headlight in a vertical direction when it is assumed that the optical axis of the headlight passes through a target located at the detected distance with respect to the controlled vehicle. The target has a predetermined height above a predetermined reference point, and the predetermined height of the target is unchanged irrespective of change in the detected distance. The system includes a first adjuster configured to adjust the direction of the optical axis of the headlight in the vertical direction so that the direction of the optical axis is matched with the determined first target direction.

With the configuration of the system, even if the distance between the controlled vehicle and the other vehicle ahead thereof is changed, the optical axis of the headlight is consistently directed toward the target.

Thus, it is possible to optimally adjust the optical axis of the headlight with little influence of increase and/or reduction in the detected distance between the controlled vehicle and the other vehicle.

This can prevent the light beam produced by the headlight from dazzling the driver of the other vehicle ahead of the controlled vehicle even if the detected distance between the controlled vehicle and the other vehicle increases.

The structure of the headlight control system can also prevent occurrence of an unirradiated region between the other vehicle and an irradiated field of the light beam produced by the headlight.

BRIEF DESCRIPTION OF THE DRAWINGS

Other objects and aspects of the invention will become apparent from the following description of embodiments with reference to the accompanying drawings in which:

FIG. 4 is a view schematically illustrating an example of applying the method to determine the first target angles of respective different targets according to the first embodiment;

FIG. 9 is a flowchart schematically illustrating a leveling task to be executed by a leveling computer illustrated in FIG. 7; and FIG. 10 is a flowchart schematically illustrating a driving-mode determination subroutine in step S510 of FIG. 9.

DETAILED DESCRIPTION OF EMBODIMENTS OF THE INVENTION

Figure 1:
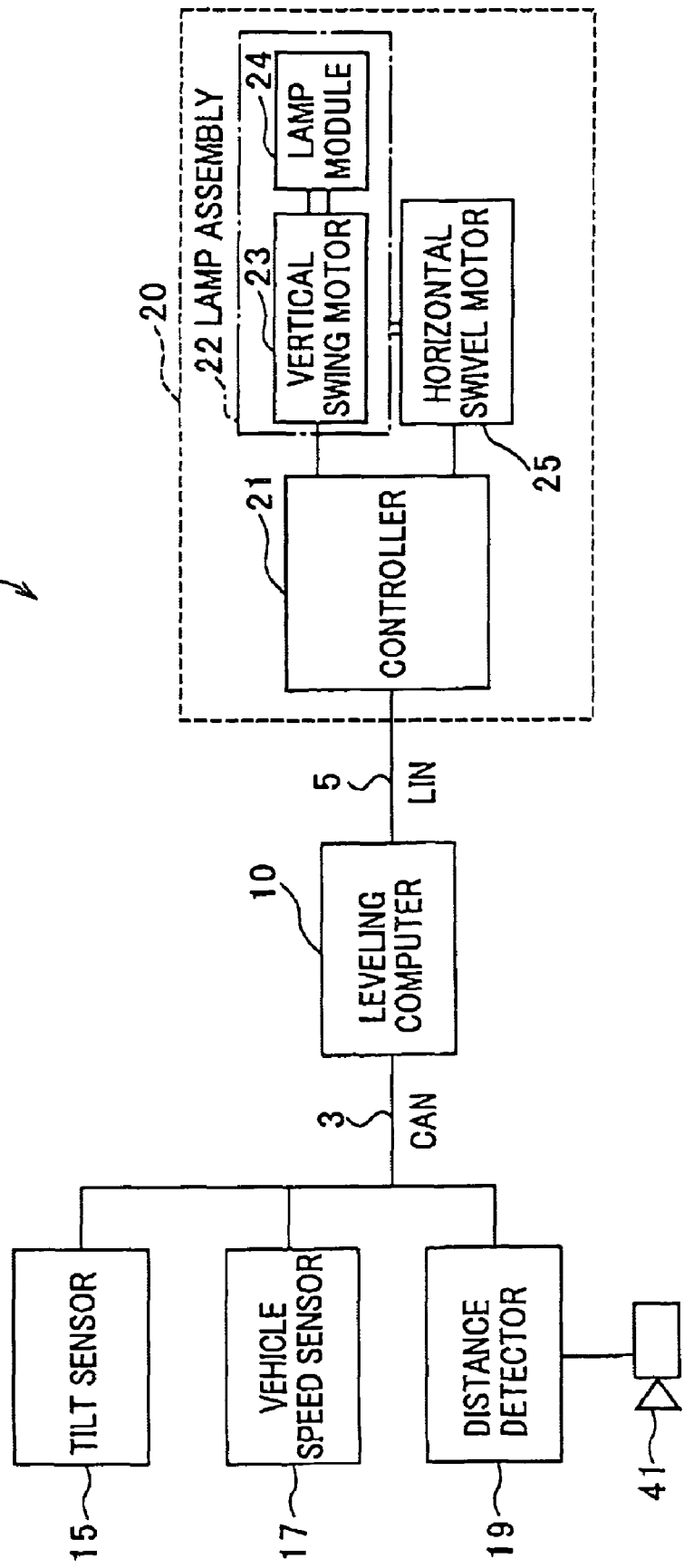
FIG. 1 is a block diagram schematically illustrating an example of the overall structure of a headlight control system according to a first embodiment of the present invention.

Embodiments of the present invention will be described hereinafter with reference to the accompanying drawings. In the drawings, identical reference characters are utilized to identify identical corresponding components.

First Embodiment

Referring to FIG. 1, there is illustrated an example of the overall structure of a headlight control system 1 to which the present invention is applied. The headlight control system 1 is installed in a vehicle to be controlled, such as a motor vehicle.

Specifically, the headlight control system 1 is equipped with a leveling computer 10, a tilt sensor 15, a vehicle speed sensor 17, and a detector 19 for detecting a distance between the controlled vehicle and a preceding vehicle that the controlled vehicle follows. The leveling computer 10, the tilt sensor 15, the vehicle speed sensor 17, and the distance detector 19 are connected to each other via a CAN (Controller area Network) bus 3. The CAN bus 3 allows the leveling computer 10, the vertical tilt sensor 15, the vehicle speed sensor 17, and the distance detector 19 to communicate with each other in a CAN communication protocol.

The leveling computer 10 is connected to a LIN (Local Interconnect Network) bus 5, and the LIN bus 5 is connected to a pair of headlights 20. The LIN bus 5 allows the leveling computer 10 and the pair of headlights to communicate with each other in a LIN protocol.

The tilt sensor 15 is operative to periodically or continuously detect a tilt of the controlled vehicle in the direction of traveling based on the difference between a measured value of a first height sensor mounted on the front end of the controlled vehicle and that of a second height sensor mounted on the rear end thereof. The tilt sensor 15 is also operative to send, to the leveling computer 10, a detected value of the tilt in digital format (CAN format).

The vehicle speed sensor 17 is operative to periodically or continuously measure the speed of the controlled vehicle and to send, to the leveling computer 10, a measured value of the vehicle speed in digital format (CAN format).

The distance detector 19 is connected to a monitor camera 41 mounted on, for example, the front end of the controlled vehicle; this monitor camera 41 is operative to periodically or continuously pick up a plurality of images of a predetermined region ahead of the controlled vehicle.

Specifically, the distance detector 19 is operative to periodically or continuously execute a distance detecting task by:
receiving the plurality of images picked up by the monitor camera 41;
subjecting the received images to common image processing for inter-vehicle distance detection to thereby detect the first distance between the controlled vehicle and a preceding vehicle that the controlled vehicle follows and the second distance between the controlled vehicle and an oncoming vehicle; and
sending, to the leveling computer 10, a detected value of the first distance and that of the second distance in digital format (CAN format).

For example, the common image processing includes a process designed to:
find at least one headlight of an oncoming vehicle and/or at least one tail light (tail lamp) of a preceding vehicle based on the picked-up images ahead the controlled vehicle;
measure the location of the at least one headlight in the vertical direction and/or the location of the at least one tail lamp in the vertical direction; and
determine the distance between the controlled vehicle and the oncoming vehicle based on the measured location of the at least one headlight in the vertical direction and/or the distance between the controlled vehicle and the preceding vehicle based on the measured location of the at least one tail lamp in the vertical direction.

In addition, the common image processing includes a process designed to:
find a pair of headlights of an oncoming vehicle and/or a pair of tail lights (tail lamps) of a preceding vehicle based on the picked-up images ahead the controlled vehicle;
measure an interval between the paired headlights and/or an interval between the paired tail lamps; and
determine the distance between the controlled vehicle and the oncoming vehicle based on the measured interval between the paired headlights and/or the distance between the controlled vehicle and the preceding vehicle based on the measured interval between the paired tail lamps.

Note that, in the first embodiment, the distance detector 19 is designed to detect the distance between the controlled vehicle and a target vehicle (a preceding vehicle or an oncoming vehicle) ahead thereof by subjecting the plurality of images of the predetermined region in front of the controlled vehicle. The distance detector can be designed to detect the distance between the controlled vehicle and a target vehicle by:
controlling a radar and/or a sonar to transmit radio waves and/or ultrasonic waves ahead of the controlled vehicle; and
receiving echoes based on the transmitted radio waves and/or ultrasonic waves to thereby detect the distance between the controlled vehicle and a target vehicle on the basis of the received echoes.

The leveling computer 10 is designed as a common microcomputer and its peripherals; this microcomputer consists of a CPU, a rewritable ROM, a RAM, and so on.

The leveling computer 10 is operative to receive the measurements sent via the CAN bus 3 from the tilt sensor 15, the vehicle speed sensor 17, and the distance detector 19, and execute, based on the received measurements, a leveling task.

The leveling task is to determine:
a first target angle for an angle of the optical axis of each headlight 20 with respect to a first predetermined reference angle $\theta r1$ in the vertical direction orthogonal to the road surface on which the controlled vehicle is running; and
a second target angle for an angle of the optical axis of each headlight 20 with respect to a second predetermined reference angle $\theta r2$ in the horizontal direction orthogonal to the vertical direction.

The angle of the optical axis of each headlight 20 with respect to the first reference angle $\theta r1$ in the vertical direction will be referred to as "vertical irradiation angle" hereinafter.

Similarly, the angle of the optical axis of each headlight 20 with respect to the second reference angle θr2 in the horizontal direction will be referred to as "horizontal irradiation angle" hereinafter.

In the first embodiment, the first reference angle θr1 represents an angle, such as 0 degrees, of the optical axis of each headlight 20 in the vertical direction when the optical axis thereof is substantially in parallel with the road surface. The second reference angle θr2 represents an angle, such as 0 degrees, of the optical axis of each headlight 20 in the horizontal direction when the optical axis thereof is substantially in parallel with or is slightly sloped inward from the direction of traveling of the controlled vehicle.

Note that the first target angle represents a value of the vertical irradiation angle at which the optical axis of each headlight 20 should be directed, and the second target angle represents a value of the horizontal irradiation angle at which the optical axis of each headlight 20 should be directed.

The leveling computer 10 is also operative to send, to each headlight 20 via the LIN bus 5, an instruction in LIN format for causing each headlight 20 to direct the optical axis of the headlight 20 at both the first target angle and the second target angle.

Figure 3:
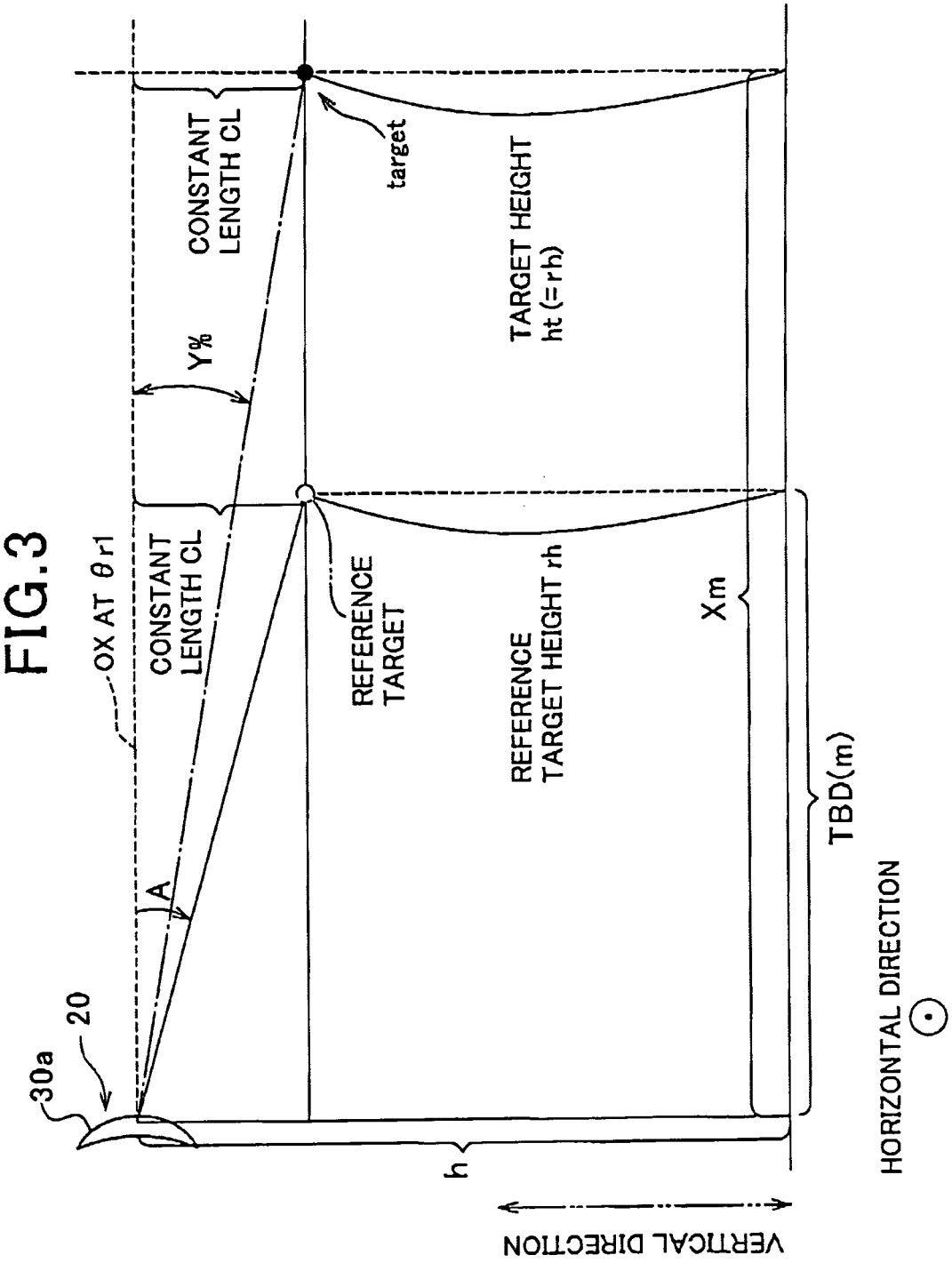
FIG. 3 is a view schematically illustrating a method of determining the first target angle for a target according to the first embodiment.

For example, the paired headlights 20 are mounted on both sides of the front end of the controlled vehicle so that their optical axes have a predetermined height of h [m] with respect to the road surface (see FIG. 3). The instruction being sent from the leveling computer 10 is input to each of the paired headlights 20. In FIG. 1, one of the paired headlight 20 is only illustrated for the sake of simplicity.

Each of the headlights 20 is provided with a controller 21, a lamp assembly 22, and a horizontal swivel motor 25. The lamp assembly 22 consists of a lamp module 24 and a vertical swing motor 23.

Figure 2:
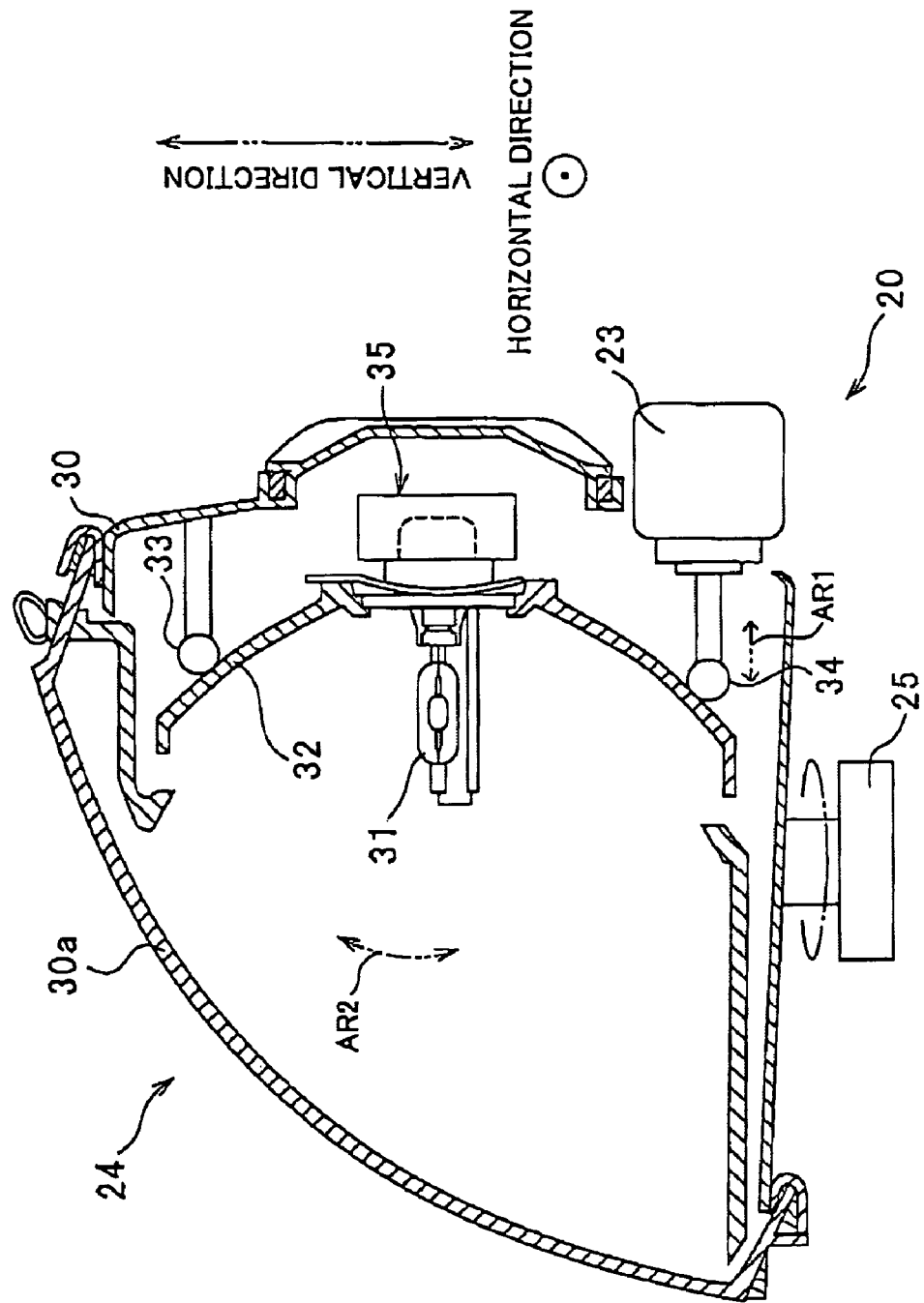
FIG. 2 is a cross-sectional view schematically illustrating an example of the structure of each headlight illustrated in FIG. 1.

As illustrated in FIG. 2, the lamp module 24 consists of a housing 30, a lamp 31, a parabolic reflector 32, a stationary support member 33, a movable support member 34, and a headlight circuit 35.

One example of the structure of the lamp module 24 will be described hereinafter.

The housing 30 has a substantially cylindrical shape with one end wall and the other end wall formed with a lens 30a. The housing 30 is arranged such that the lens 30a is directed ahead of the controlled vehicle.

The parabolic reflector 32 installed in the housing 30 has an inner parabolic shape with a predetermined focus point, and is arranged such that the inner parabolic surface is opposite to the lens 30a of the housing 30. The lamp 31 is fixedly disposed at the focus point of the parabolic reflector 32 such that the light produced thereby is incident to the inner parabolic surface of the reflector 32.

The reflector 32 works to reflect at its inner parabolic surface the incident light so that a parallel light beam is produced aligned with the center axis OX (see FIG. 3) of the inner parabolic surface; this center axis OX of the inner parabolic surface of the reflector 32 corresponds to the optical axis of a corresponding one of the headlights 20.

The parallel light beam is irradiated via the lens 30a ahead of the controlled vehicle.

One end of the stationary support member 33 is mounted on the one end wall of the housing 30. A top portion of the outer surface of the reflector 32 is supported by the other end of the stationary support member 33 to be swingable in the vertical direction.

One end of the movable support member 34 is coupled to the vertical swing motor 23, and a lower portion of the outer surface of the reflector 32 is supported by the other end of the movable support member 34. The vertical swing motor 23 is mounted in the one end wall of the housing 30 to be integrated therewith.

The structure of the movable support member 34 and the vertical swing motor 23 allows rotation of the vertical swing motor 23 to move the movable support member 34 in the direction of traveling (see the two-dot chain linear arrow AR1 in FIG. 2). The movement of the movable support member 34 allows the reflector 32 to swing in the vertical direction via the stationary support member 33 (see the two-dot chain arc arrow AR2 in FIG. 2).

The swinging of the reflector 32 in the vertical direction permits the optical axis OX of a corresponding one of the headlights 20 to be changed in the vertical direction. In other words, the swinging of the reflector 32 in the vertical direction permits the parallel light beam produced by the lamp 31 and the reflector 32 to be swung in the vertical direction.

The vertical swing motor 23 is connected to the controller 21. The controller 21 is operative to control the rotation of the vertical swing motor 23 to thereby adjust the direction of the optical axis OX of a corresponding one of the headlights 20 in the vertical direction.

The horizontal swivel motor 25 is connected to the controller 21 and is configured to rotatably support the housing 30 in the horizontal direction. Specifically, rotation of the horizontal swivel motor 25 under control of the controller 21 allows the lamp assembly 22 to swivel in the horizontal direction.

The swiveling of the lamp assembly 22 in the horizontal direction permits the direction of the optical axis OX of a corresponding one of the headlights 20 to be changed in the horizontal direction. In other words, the swiveling of the lamp assembly 22 in the horizontal direction permits the parallel light beam produced by the lamp 31 and the reflector 32 to be swiveled in the horizontal direction. Specifically, the horizontal swivel motor 25 serves as a swiveling mechanism.

The controller 21 is connected to the leveling computer 10 via the LIN bus 5 and is designed as a common microcomputer and its peripherals; this microcomputer consists of a CPU, a rewritable ROM, a RAM, and so on.

The controller 21 is operative to rotatably drive each of the vertical swing motor 23 and the horizontal swivel motor 25 individually based on the instruction including the first and second target angles and sent from the leveling computer 10.

Specifically, the controller 21 is programmed to:

compute the angular difference between the actual vertical irradiation angle and the first target angle included in the instruction;

rotatably drive the vertical swing motor 23 so as to eliminate the computed difference therebetween;

compute the angular difference between the actual horizontal irradiation angle and the second target angle included in the instruction; and rotatably drive the horizontal swivel motor 25 so as to eliminate the computed difference therebetween.

This allows the actual vertical and horizontal irradiation angles to be matched with the first and second target angles, respectively.

The headlight circuit 35 is connected at its one end to a battery installed in the controlled vehicle via a headlight switch operable by, for example, the driver. The headlight circuit 35 is also connected at its the other end to the head lamp 31 of each of the headlights 20.

When the headlight switch is switched on, the headlight circuit 35 applies, to the head lamp 31, a voltage supplied from the battery so as to cause the head lamp 31 to produce light. When the headlight switch is switched off, the headlight circuit 35 stops, to the head lamp 31, the application of the voltage supplied from the battery so that the light is turned off.

Next, how to compute the first target angle by the leveling computer 10 will be described hereinafter with reference to FIGS. 3 and 4. How to compute the second target angle by the leveling computer 10 will be described in detail hereinafter.

FIG. 3 schematically illustrates a method of determining the first target angle for a target, and FIG. 4 schematically illustrates an example of applying the method to determine the first target angles of respective different targets [X1], [X2], and [X3].

In the first embodiment, the leveling computer 10 has stored therein a reference target height rh with respect to the road surface; this reference target height rh is lower than the height h of the optical axis of each headlight 20 by a constant length CL. The reference target height rh remains unchanged irrespective of variation of the distance between the controlled vehicle and another vehicle ahead thereof.

The leveling computer 10 works to:
  determine a target having the reference target height rh with respect to the road surface; and
  compute an angle of the optical axis OX of each headlight 20 with respect to the first reference angle θr1 when the optical axis OX passes through a target detected by the distance detector 19 and having the reference target height rh.

Specifically as illustrated in FIG. 3, the leveling computer 10 is programmed to store therein a reference gradient A of the optical axis OX of each headlight 20 in the vertical direction when the optical axis OX passes through a reference target located at a predetermined reference distance TBD from a predetermined reference position of a corresponding one of the headlights 20.

The reference gradient A of the optical axis OX of each headlight 20 in the vertical direction represents a vertical length of any point of the optical axis OX per unit horizontal length in percentage.

For example, the predetermined reference distance TBD is set to 10 [m], and the reference gradient A is set to −1.5 (%). The negative sign assigned to the reference gradient A represents that the optical axis OX of each headlight 20 is dimmed (dipped) with respect to the direction of the optical axis OX located at the first reference angle θr1.

The reference target height rh of the reference target located at the predetermined reference distance TBD from a corresponding one of the headlights 20 is therefore given by "rh[m]=h+0.01×A×TBD".

Thus, when a target, such as a part of the rear end or front end of a target vehicle ahead of the controlled vehicle, is located at the distance X[m] from the predetermined reference point of a corresponding one of the headlights 20 longer than the reference distance TBD, because the target has a height ht that is the same as the reference target height rh, the leveling computer 10 can compute the height ht of the target based on the equation of "ht[m]=h+0.0×A×TBD".

However, because the distance X[m] of the target is longer than the reference distance TBD of the reference target, the leveling computer 10 is programmed to compute, as the first target angle, a target gradient Y of the optical axis OX of each headlight 20 in the vertical direction when the optical axis OX passes through the target located at the distance X [m] from a corresponding one of the headlights 20 as follows.

Specifically, the height ht of the target can be given by the equation "ht[m]=h+0.01×Y(<0)×X".

Because the reference target height rh is equivalent to the height ht of the target, the following equation [1] is given based on the relationship between the reference target height rh and the height ht of the target:

$$h+0.01 \times A \times TBD = h + 0.01 \times Y \times X \qquad \text{[Equation 1]}$$

The leveling computer 10 is programmed to therefore compute the target gradient Y such that equation [1] can be established.

In addition, with reference to the height ht of a corresponding one of the paired headlights 20, the following equation [2] is given based on the relationship between the reference target height rh and the height ht of the target:

$$0.01 \times A \times TBD = 0.01 \times Y \times X \qquad \text{[Equation 2]}$$

Solving of the equation [1] or [2] for target gradient Y therefore allows the target gradient Y to be represented by the following equation [3]:

$$Y[\%] = TBD \times A / X \qquad \text{[Equation 3]}$$

Specifically, the leveling computer 10 is programmed to compute the target gradient Y based on the equation [3].

After determination of the target gradient Y of the optical axis OX of each headlight 20 in the vertical direction, the leveling computer 10 is programmed to send, to the controller 21 of a corresponding one of the headlights 20, an instruction indicating the target gradient Y as the first target angle.

Note that the leveling computer 10 can be programmed to convert the target gradient Y [%] into an angular value in degree or radian and to send, to the controller 21 of a corresponding one of the headlights 20, the converted angular value. For example, the target gradient Y [%] can be converted into an angular value in degree in accordance with the following equation [4]:

$$Y[\text{degree}] = \tan^{-1}(Y[\%]/100) \qquad \text{[Equation 4]}$$

Assuming that the vertical swing motor 23 is designed as a stepping motor, the leveling computer 10 can be programmed to compute the number of steps per revolution, and to send, to the controller 21 of a corresponding one of the headlights 20, the computed number of steps. For example, the leveling computer 10 can be programmed to divide, by a control angle per unit step, the right-hand side of the equation [4] to thereby obtain the number of steps per revolution.

As described above, the target gradient Y can be expressed as a function of the reference gradient A and a distance between a corresponding target vehicle and the controlled vehicle while the height of a target located at the distance is unchanged.

Note that, in the first embodiment, the upper limit of the target gradient Y of the optical axis OX of each of the headlights 20 is set to, for example, 0% corresponding to the vertical irradiation angle of the optical axis OX is 0 degrees. The lower limit of the target gradient Y of the optical axis OX of each of the headlights 20 is set to, for example, −2.0%.

For this reason, as illustrated in FIG. 4, even if different preceding vehicles 100X1, 100X2, and 100X3 are provided at their rear ends with respective target position [X1], [X2], and [X3] having the respective different distances [X1], [X2], and [X3] with respect to the controlled vehicle, it is possible to determine the target gradient Y [%] for each of the target positions [X1], [X2], and [X3] based on the equation [3] or [4] obtained by the common reference target height rh.

As illustrated in FIG. 4, the reference target height rh can be determined as a position at the rear end of a common motor vehicle; this position is lower than a rear windshield of the common motor vehicle.

Next, how to compute the second target angle by the leveling computer 10 will be described hereinafter with reference to FIGS. 5A and 5B.

As described above, each of the headlights 20 of the controlled vehicle (see 'CV' in FIG. 5A) is equipped with the swivel mechanism 25. The swivel mechanism 25 is operative to swivel, in the horizontal direction, the optical axis OX of each of the headlights 20 located at the corresponding second reference angle θr2 toward the other headlight 20.

Specifically, the right headlight 20 allows the corresponding optical axis OX to swivel in the horizontal direction away from the longitudinal center axis of the controlled vehicle CV up to a limit angular position with a maximum swivel angle Wmax [degrees] with respect to the second reference angle θr2. Similarly, the left headlight 20 allows the corresponding optical axis OX to swivel in the horizontal direction away from the longitudinal center axis of the controlled vehicle CV up to a limit angular position with a maximum swivel angle−Wmax [degrees] with respect to the second reference angle θr2.

Figure 5A:
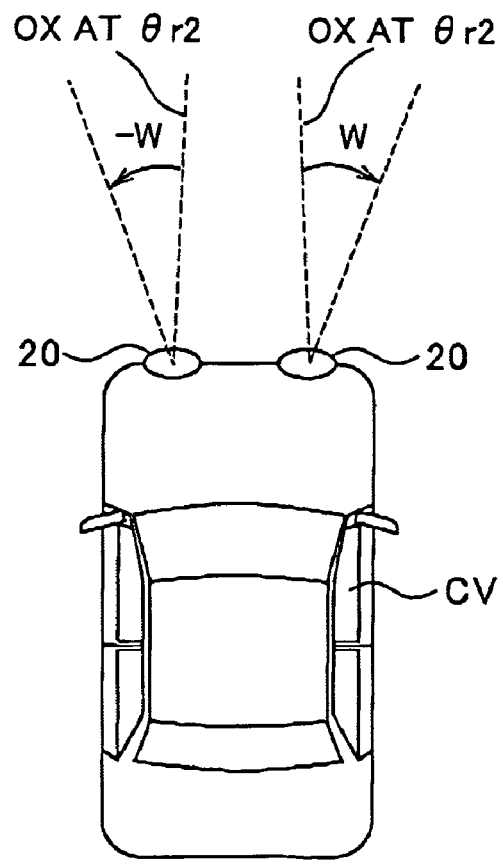
FIG. 5A is a plan view schematically illustrating a swiveling angle of an optical axis of each headlight according to the first embodiment.

Note that, in FIG. 5A, a swiveling angle W[degrees] of the optical axis OX from left to right is set as a positive swivel angle (+W).

The leveling computer 10, the controller 21, and the swivel mechanism 25 are configured to change the optical axis OX of each of the headlights 20 by a swiveling angle W as the second target angle such that the absolute value of the swiveling angle W for one of the headlights 20 and that of the swiveling angle W for the other thereof are equal to each other.

Figure 5B:
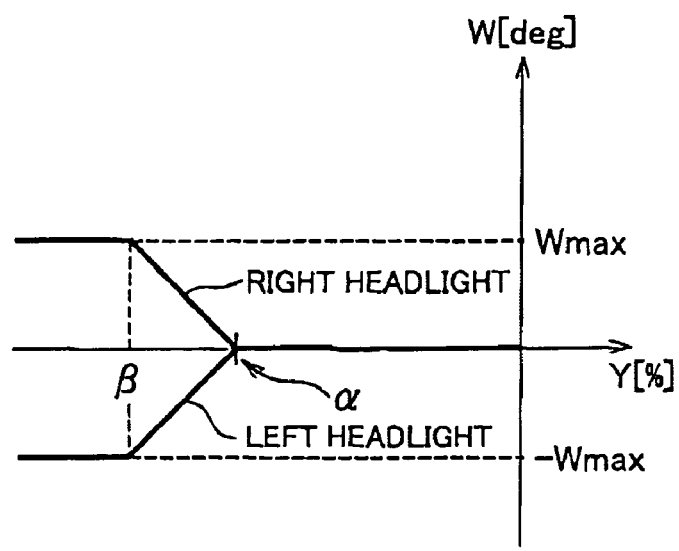
FIG. 5B is a graph schematically illustrating the relationship between the swiveling angle for each headlight and a target gradient of the optical axis in the vertical direction according to the first embodiment.

In the first embodiment, the leveling computer 10 is programmed to determine a value of the swiveling angle W of the optical axis OX of each of the headlights 20 in the horizontal direction so as to maintain the swiveling angle W at the corresponding reference second reference angle θr2 when the target gradient Y [%] of the optical axis OX in the vertical direction is equal to or greater than a predetermined value α [%] of, for example, −1.2 [%] (see FIG. 5B).

Note that the graph illustrated in FIG. 5B and representing the relationship between the swiveling angle W for each of the right and left headlights 20 and the target gradient Y [%] of the optical axis OX in the vertical direction has been stored in, for example, the ROM of the leveling computer 10 in the form of a data or a program.

In other words, when the target gradient Y[%] of the optical axis OX in the vertical direction is equal to or greater than the predetermined value α [%] of, for example, −1.2 [%], the leveling computer 10 is programmed to change a value of the swiveling angle W of the optical axis OX of each of the headlights 20 in the horizontal direction to zero (see FIG. 5B).

When the target gradient Y [%] of the optical axis OX in the vertical direction is less than the predetermined value α [%] and equal to or greater than a predetermined value β [%] of, for example, −1.5 [%] lower than the predetermined value α [%], the leveling computer 10 is programmed to determine a value of the swiveling angle W of the optical axis OX of each of the headlights 20 in the horizontal direction so as to continuously increase the absolute value of the swiveling angle W with reduction in the target gradient Y [%] of the optical axis OX in the vertical direction.

In other words, the leveling computer 10 is programmed to continuously increase the absolute value of the swiveling angle W of the optical axis OX of each of the headlights 20 in the horizontal direction with reduction in the distance between the controlled vehicle CV and another vehicle ahead thereof.

The more the distance between the controlled vehicle CV and another vehicle ahead thereof is reduced and the more the optical axis OX of each of the headlights 20 in the vertical direction is dipped (dimmed), the wider a region over which the light beam produced by each of the headlights 20 is irradiated is in the horizontal direction.

When the target gradient Y [%] of the optical axis OX in the vertical direction is less than the predetermined value β [%], the leveling computer 10 is programmed to determine a value of the swiveling angle W of the optical axis OX of each of the headlights 20 in the horizontal direction so as to maintain the optical axis OX at the corresponding maximum swiveling angle Wmax (right headlight) or −Wmax (left headlight).

In other words, when the target gradient Y [%] of the optical axis OX in the vertical direction is less than the predetermined value β [%], a region over which the light beam produced by each of the headlights 20 is irradiated is the widest in the horizontal direction.

After determination of a value of the swiveling angle (second target angle) W of the optical axis OX of each of the headlights 20 in the horizontal direction, the leveling computer 10 is programmed to send, to the controller 21 of a corresponding one of the headlights 20, an instruction indicative of the determined value of the swiveling angle W.

As described above, in the first embodiment, the leveling computer 10 is programmed to compute a value of the target gradient Y based on the relationship between the target gradient Y and each of the reference gradient A and a distance between a corresponding target vehicle and the controlled vehicle while the height ht of a target is kept constant in spite of the distance between a corresponding target vehicle and the controlled vehicle being changed.

In addition, in the first embodiment, the controlled vehicle can operate in any one of a plurality of driving modes of the controlled vehicle; these driving modes include town mode, normal mode, the first motorway mode, and the second motorway mode.

The town mode represents a driving scene in which the controlled vehicle is estimated to be running in well-illuminated urban areas.

The normal mode represents a driving scene in which the controlled vehicle is estimated to be running in a residential block or suburban area.

The first motorway mode represents a driving scene in which the controlled vehicle is estimated to be running in a motorway.

The second motorway mode represents a driving scene in which the controlled vehicle is estimated to be running in a motorway and the vehicle speed is higher than that of the controlled vehicle in the first motorway mode.

The leveling computer 10 is programmed to determine which driving mode the controlled vehicle operates in based on the change in the combination between a variable of the vehicle speed and that of the distance between the controlled vehicle and another vehicle ahead thereof.

The leveling computer 10 is also programmed to change a value of the reference gradient A based on which driving mode it operates in.

For example, when the controlled vehicle operates in the town mode, the leveling computer 10 is programmed to determine −1.5 [%] as a value of the reference gradient A, and when being operating in the normal mode, the leveling computer 10 is programmed to determine −1.2 [%] as a value of the reference gradient A.

Similarly, when the controlled vehicle operates in the first motorway mode, the leveling computer 10 is programmed to determine −1.1 [%] as a value of the reference gradient A, and when being operating in the second motorway mode, the leveling computer 10 is programmed to determine −1.0 [%] as a value of the reference gradient A.

Change in the reference gradient A allows the reference target height rh and the height of a target corresponding thereto to be changed. The leveling computer 10 is therefore programmed to determine a value of the first target angle while the changed reference target height rh (the changed height of a target) is kept constant.

Figure 6:
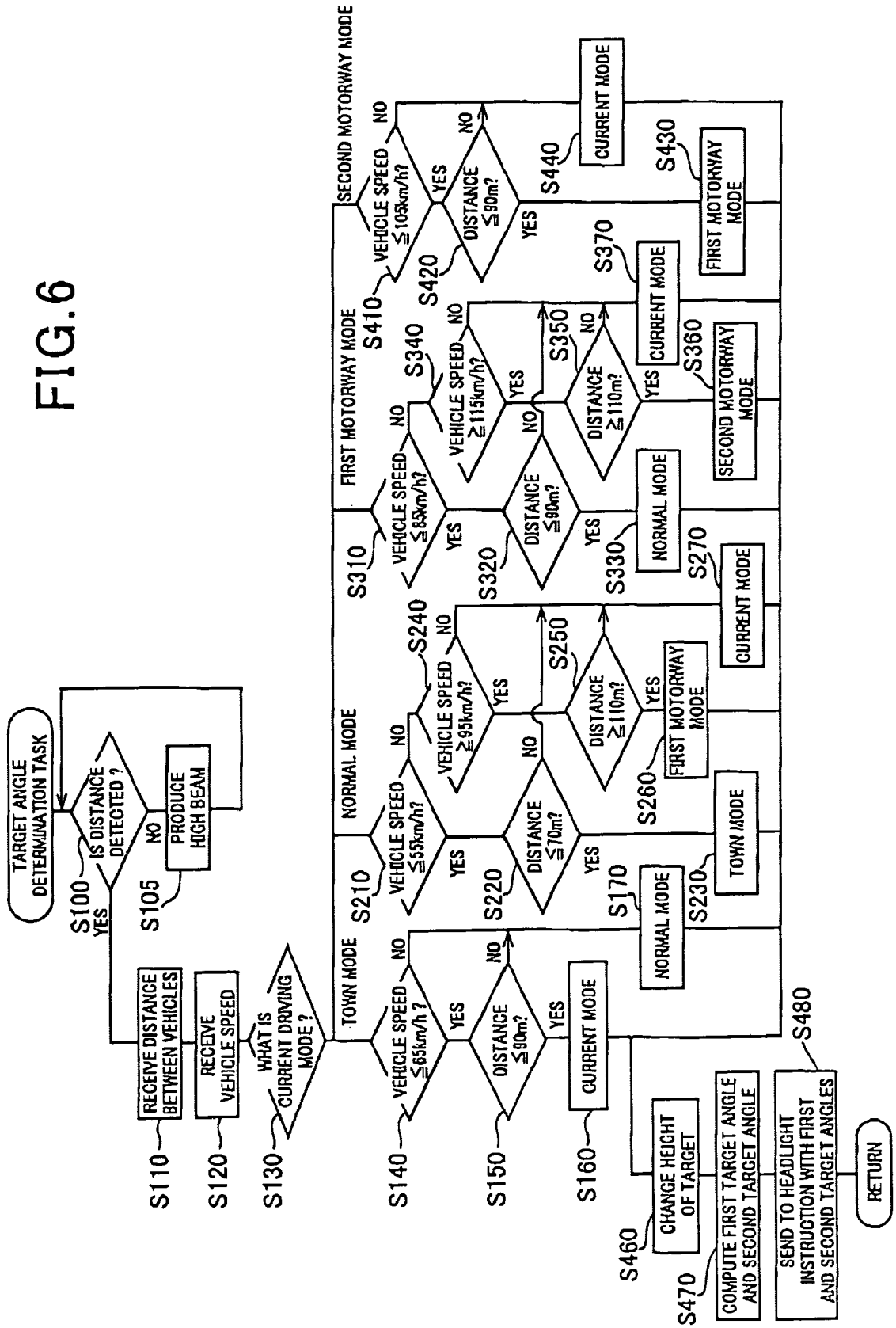
FIG. 6 is a flowchart schematically illustrating a leveling task to be executed by a leveling computer illustrated in FIG. 1.

Next, the leveling task (target angle determination task) to be executed by the leveling computer 10 while the driving mode thereof is shifted depending on the change in the combination of the vehicle speed and the distance between the controlled vehicle and another vehicle ahead thereof will be described hereinafter in detail with reference to FIG. 6. For example, a leveling program installed in, for example, the ROM of the leveling computer 10 causes the CPU thereof to execute the leveling task.

Note that the leveling program is launched every time an ignition switch of the controlled vehicle is turned on so that the engine is started, and the leveling program is terminated when the ignition switch of the controlled vehicle is turned off so that the engine is stopped. In addition, note that, when the leveling program is launched, the driving mode is set to the normal mode as the default driving mode.

When the leveling program is launched, the leveling computer 10 determines whether the distance between the controlled vehicle and a target vehicle (a preceding vehicle or an oncoming vehicle) in step S100.

When no information is sent from the distance sensor 19, the leveling computer 10 determines that there are no preceding vehicles and no oncoming vehicles in the predetermined region to be monitored by the monitor camera 41 ahead of the controlled vehicle (the determination in step S100 is NO). Then, the leveling computer 10 sends, to the controller 21 of each of the headlights 20, an instruction indicative of the first predetermined angle θr1 as the first target angle and of the second predetermined reference angle θr2 as the second target angle in step S105. Thereafter, the leveling computer 10 returns to step S100 and repeats the determination in step S100.

When receiving the instruction, the controller 21 of each of the headlights 20 rotatably drives the vertical swing motor 23 to thereby adjust the direction of the optical axis OX of a corresponding one of the headlights 20 in the vertical direction to the first reference angle θr1. Similarly, the controller 21 of each of the headlights 20 rotatably drives the horizontal swivel motor 25 to thereby adjust the direction of the optical axis OX of a corresponding one of the headlights 20 in the horizontal direction to the second reference angle θr2 (second target angle).

As a result, the light beam transmitted from each of the headlights 20 serves as a high beam with a narrow width in the horizontal direction (see FIGS. 4 and 5A) so as to have longer and narrower light distributions to increase the driver's visibility at greater distances.

Otherwise, when a detected value is sent from the distance sensor 19, the leveling computer 10 determines that there is a preceding vehicle and/or an oncoming vehicle ahead of the controlled vehicle (the determination in step S100 is YES). Then, the leveling computer 10 receives the detected value of the distance between the controlled vehicle and a target vehicle in step S110, and receives the measured value of the vehicle speed from the vehicle speed sensor 17 in step S120.

Next, the leveling computer 10 determines which driving mode is set to the current driving mode of the controlled vehicle in step S130.

When it is determined that the town mode is set to the current driving mode of the controlled vehicle ("town mode" in step S130), the leveling computer 10 goes to step S140.

When it is determined that the normal mode is set to the current driving mode of the controlled vehicle ("normal mode" in step S130), the leveling computer 10 goes to step S210.

When it is determined that the first motorway mode is set as the current driving mode of the controlled vehicle ("first motorway mode" in step S130), the leveling computer 10 goes to step S310. When it is determined that the second motorway mode is set to the current driving mode of the controlled vehicle ("second motorway mode" in step S130), the leveling computer 10 goes to step S410.

In step S140 in which the current driving mode is set to the town mode, the leveling computer 10 determines whether the received vehicle speed is equal to or lower than 65 km/h. When it is determined that the received vehicle speed is equal to or lower than 65 km/h (the determination in step S140 is YES), the leveling computer 10 determines whether the received distance between the controlled vehicle and a target vehicle is equal to or lower than 90 m in step S150.

When it is determined that the received distance between the controlled vehicle and a target vehicle is equal to or lower than 90 m (the determination in step S150 is YES), the leveling computer 10 maintains unchanged the current driving mode of the controlled vehicle, that is, the town mode in step S160, shifting to step S460.

Otherwise when it is determined that:
the received vehicle speed is higher than 65 km/h (the determination in step S140 is YES), or
the received distance between the controlled vehicle and a target vehicle is greater than 90 m (the determination in step S150 is NO), the leveling computer 10 shifts the driving mode from the current driving mode (the town mode) to the normal mode in step S170, shifting to step S460.

In step S210 in which the current driving mode is set to the normal mode, the leveling computer 10 determines whether the received vehicle speed is equal to or lower tan 55 km/h. When it is determined that the received vehicle speed is equal to or lower than 55 km/h (the determination in step S210 is YES), the leveling computer 10 determines whether the received distance between the controlled vehicle and a target vehicle is equal to or lower than 70 m in step S220.

When it is determined that the received distance between the controlled vehicle and a target vehicle is equal to or lower than 70 m (the determination in step S220 is YES), the leveling computer 10 shifts the driving mode from the current driving mode (the normal mode) to the town mode in step S230, shifting to step S460.

Otherwise when it is determined that the received vehicle speed is higher than 55 km/h (the determination in step S210 is NO), the leveling computer 10 determines whether the received vehicle speed is equal to or higher than 95 km/h in step S240.

When it is determined that the received vehicle speed is equal to or higher than 95 km/h (the determination in step S240 is YES), the leveling computer 10 determines whether the received distance between the controlled vehicle and a target vehicle is equal to or greater than 110 m in step S250.

When it is determined that the received distance between the controlled vehicle and a target vehicle is equal to or greater than 110 m (the determination in step S250 is YES), the leveling computer 10 shifts the driving mode from the current driving mode (the normal mode) to the first motorway mode in step S260, shifting to step S460.

Otherwise, when it is determined that:
the received distance between the controlled vehicle and a target vehicle is greater than 70 m (the determination in step S220 is NO),
the received vehicle speed is lower than 95 km/h (the determination in step S240 is NO), or
the received distance between the controlled vehicle and a target vehicle is lower than 110 m (the determination in step S250 is NO), the leveling computer 10 maintains unchanged the current driving mode of the controlled vehicle, that is, the normal mode in step S270, shifting to step S460.

In step S310 in which the current driving mode is set to the first motorway mode, the leveling computer 10 determines whether the received vehicle speed is equal to or lower than 85 km/h. When it is determined that the received vehicle speed is equal to or lower than 85 km/h (the determination in step S310 is YES), the leveling computer 10 determines whether the received distance between the controlled vehicle and a target vehicle is equal to or lower than 90 m in step S320.

When it is determined that the received distance between the controlled vehicle and a target vehicle is equal to or lower than 90 m (the determination in step S320 is YES), the leveling computer 10 shifts the driving mode from the current driving mode (the first motorway mode) to the normal mode in step S330, shifting to step S460.

Otherwise when it is determined that the received vehicle speed is higher than 85 km/h (the determination in step S310 is NO), the leveling computer 10 determines whether the received vehicle speed is equal to or higher than 115 km/h in step S340.

When it is determined that the received vehicle speed is equal to or higher than 115 km/h (the determination in step S340 is YES), the leveling computer 10 determines whether the received distance between the controlled vehicle and a target vehicle is equal to or greater than 110 m in step S350.

When it is determined that the received distance between the controlled vehicle and a target vehicle is equal to or greater than 110 m (the determination in step S350 is YES), the leveling computer 10 shifts the driving mode from the current driving mode (the first motorway mode) to the second motorway mode in step S360, shifting to step S460.

Otherwise, when it is determined that:
the received distance between the controlled vehicle and a target vehicle is greater than 90 m (the determination in step S320 is NO),
the received vehicle speed is lower than 115 km/h (the determination in step S340 is NO), or
the received distance between the controlled vehicle and a target vehicle is lower than 110 m (the determination in step S350 is NO), the leveling computer 10 maintains unchanged the current driving mode of the controlled vehicle, that is, the normal mode in step S370, shifting to step S460.

In step S410 in which the current driving mode is set to the second motorway mode, the leveling computer 10 determines whether the received vehicle speed is equal to or lower than 105 km/h. When it is determined that the received vehicle speed is equal to or lower than 105 km/h (the determination in step S410 is YES), the leveling computer 10 determines whether the received distance between the controlled vehicle and a target vehicle is equal to or lower than 90 m in step S420.

When it is determined that the received distance between the controlled vehicle and a target vehicle is equal to or lower than 90 m (the determination in step S420 is YES), the leveling computer 10 shifts the driving mode from the current driving mode (the second motorway mode) to the first motorway mode in step S430, shifting to step S460.

Otherwise when it is determined that:
the received vehicle speed is higher than 105 km/h (the determination in step S410 is NO), or
the received distance between the controlled vehicle and a target vehicle is greater than 90 m (the determination in step S420 is NO), the leveling computer 10 maintains unchanged the current driving mode of the controlled vehicle, that is, the second motorway mode in step S440, shifting to step S460.

In step S460, the leveling computer 10 changes the reference gradient A so as to match the changed value of the reference gradient A with the current driving mode to thereby change the reference target height rh and the height of a target corresponding thereto based on the changed value of the reference gradient A.

Specifically, when the driving scene of the controlled vehicle is shifted in the order of the second motorway, the first motorway, the normal mode, and the town mode, the vehicle speed and the distance between the controlled vehicle and a target vehicle are gradually reduced.

For this reason, depending on the driving-scene shift, the leveling computer 10 gradually reduces the reference gradient A of the optical axis OX of each of the headlights 20 in the vertical direction. This allows the reference target height rh corresponding to the height of a target to be gradually lowered.

In step S470, the leveling computer 10 computes the target gradient Y of the optical axis OX of each of the headlights 20 in the vertical direction based on the equation [3], the changed reference gradient A, and the received distance between the controlled vehicle and a target vehicle so as to pass the optical axis OX of each of the headlights 20 through the target.

In step S470, as described above, the leveling computer 10 computes the swiveling angle W of the optical axis OX of each of the headlights 20 in the horizontal direction based on the computed target gradient Y and the graph illustrated in FIG. 5B and stored in the ROM thereof.

In step S480, the leveling computer 10 sends, to the controller 21 of each of the headlights 20, the computed target gradient Y as the first target angle and the computed swiveling angle W as the second target angle. Thereafter, the leveling computer 10 returns to step S100 and repeats the operations in steps S100 to S480 until the ignition switch is turned off.

Thus, the controller 21 of each of the headlights 20 rotatably drives the vertical swing motor 23 to thereby adjust the direction of the optical axis OX of a corresponding one of the headlights 20 in the vertical direction to the computed target gradient Y (first target angle). Similarly, the controller 21 of each of the headlights 20 rotatably drives the horizontal swivel motor 25 to thereby adjust the direction of the optical axis OX of a corresponding one of the headlights 20 in the horizontal direction to the computed swiveling angle W (second target angle).

As a result, the pattern of the light beam transmitted from each of the headlights 20 ahead the controlled vehicle is automatically adjusted depending on the distance between the controlled vehicle and another vehicle ahead thereof.

As described above, the headlight control system 1 according to the first embodiment is designed to:
compute the first target angle of the optical axis OX of each headlight 20 with respect to the first reference angle $\theta r1$ when the optical axis OX is directed toward a target located at the detected distance between the controlled vehicle and another vehicle ahead thereof and having the predetermined reference target height rh with respect to the road surface; and instruct the controller 21 and vertical swinging motor 23 to adjust the optical axis OX of each headlight 20 so that the vertical irradiation angle thereof is matched with the first target angle.

Specifically, even if the distance between the controlled vehicle and the target is changed with change in the detected distance between the controlled vehicle and another vehicle ahead thereof, the optical axis OX of each headlight 20 is consistently directed toward the target. Thus, it is possible to optimally adjust the optical axis OX of each headlight 20, that is, the direction of the parallel light beam produced by each headlight 20 with little influence of increase and/or reduction in the detected distance between the controlled vehicle and another vehicle ahead thereof.

This can prevent the light beam produced by each headlight 20 from dazzling the driver of another vehicle ahead of the controlled vehicle even if the detected distance between the controlled vehicle and another vehicle ahead thereof increases.

The structure of the headlight control system 1 can also prevent occurrence of an unirradiated region between another vehicle and an irradiated field of the light beam produced by each headlight 20.

In addition, before computing the first target angle, the headlight control system 1 is designed to change the reference target height rh corresponding to the height of a target depending on the variation in the vehicle speed.

Specifically, the headlight control system 1 is designed to gradually reduce the reference target height rh corresponding to the height of a target depending on the gradual reduction in the vehicle speed, and to gradually increase the reference target height rh corresponding to the height of a target depending on the gradual increase in the vehicle speed.

The configuration of the headlight control system 1 allows an irradiated region by the light beam produced by each headlight 20 to become close to the controlled vehicle depending on the reduction in the vehicle speed. Thus, it is possible to increase the driver's visibility at closer distances at low vehicle speeds as well as reduce dazzle.

In addition, the configuration of the headlight control system 1 allows the irradiated region by the light beam produced by each headlight 20 to become away from the controlled vehicle depending on the increase in the vehicle speed. Thus, it is possible to increase the driver's visibility at high vehicle speeds and at greater distances.

Note that the headlight control system 1 is designed to change the reference target height rh (the height of a target) within a predetermined range; this limitation of the change in the height of a target can prevent the light beam produced by each headlight 20 from dazzling the driver of another vehicle ahead of the controlled vehicle, and prevent occurrence of an unirradiated region between another vehicle and an irradiated field of the light beam produced by each headlight 20.

The headlight control system 1 is further configured to, when, for instance, the vehicle speed is gradually reduced, gradually widen a region over which the light beam produced by each headlight 20 is irradiated in the horizontal direction while gradually dipping the light beam. This allows the light beam produced by each headlight 20 to have shorter and wider light distribution to increase the driver's visibility at closer distances.

Accordingly, when the controlled vehicle reduces the speed in order to turn, for example, a corner, the headlight control system 1 enlarges the beam-irradiated region at closer distances, making it possible for the driver to easily watch circumstances around the corner.

Second Embodiment

Figure 7:
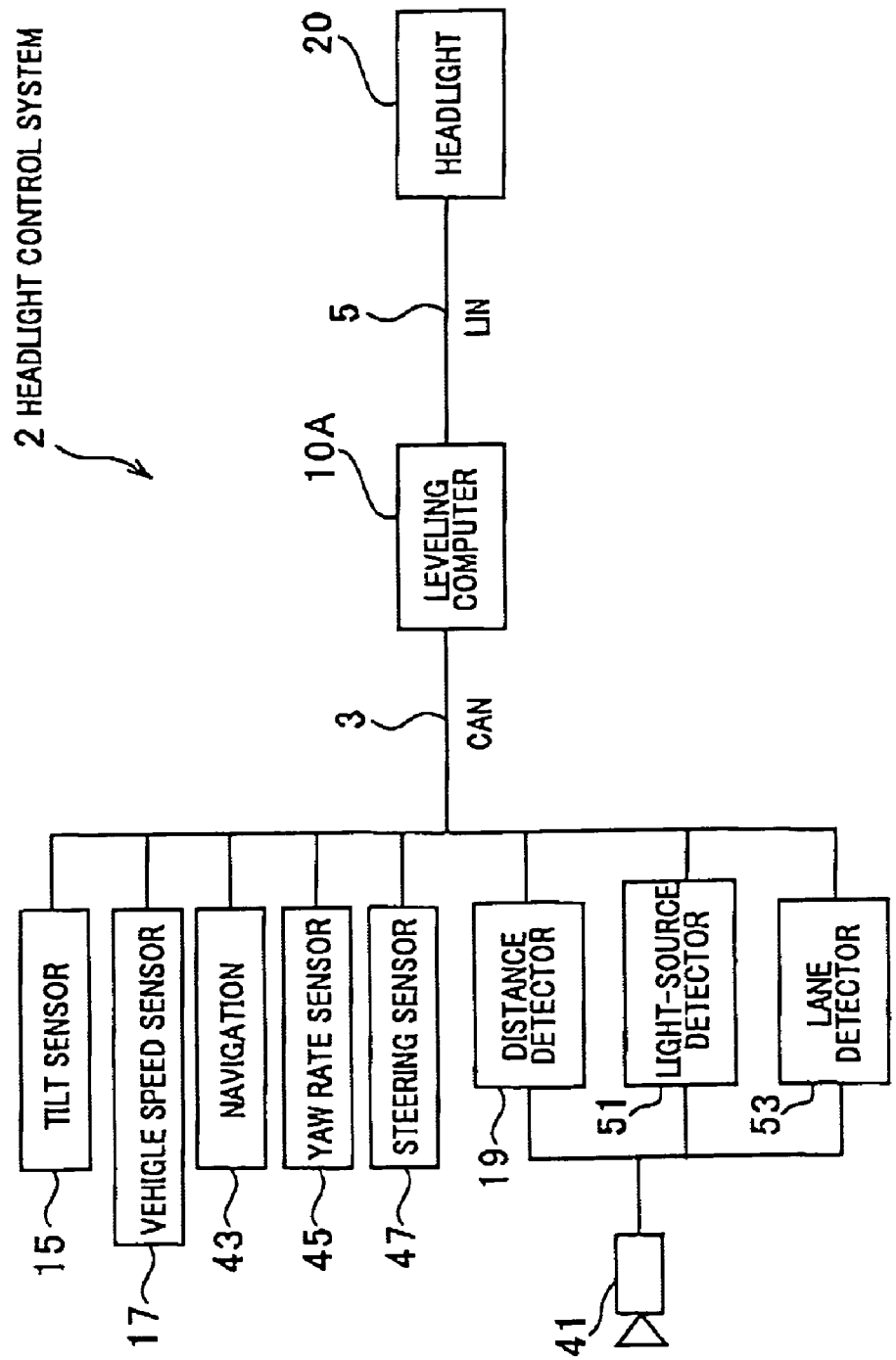
FIG. 7 is a block diagram schematically illustrating an example of the overall structure of a headlight control system according to a second embodiment of the present invention.

Referring to FIG. 7, there is illustrated an example of the overall structure of a headlight control system 2 to which the present invention is applied. Like parts between the headlight control systems 1 and 2 according to the first and second embodiments, to which like reference characters are assigned, are omitted or simplified in description.

The headlight control system 2 according to the second embodiment is equipped with, in addition to the components 15, 17, 19, and 20 of the headlight control system 1, a leveling computer 10A, a navigation system 43, a yaw rate sensor 45, a steering sensor 47, a light-source detector 51, and a lane detector 53. The navigation system 43, the yaw rate sensor 45, the steering sensor 47, the light-source determining device 51, and the driving lane determining device 53 are connected to the CAN bus 3. The CAN bus 3 allows the leveling computer 10A, the navigation system 43, the yaw rate sensor 45, the steering sensor 47, the light-source detector 51, and the lane detector 53 to communicate with each other in the CAN communication protocol.

In addition to the monitor camera 41, the light-source detector 51 and the lane detector 53 are connected to the monitor camera 41.

The navigation system 43 is composed of a memory and a display device, and electric map image data has been stored in the memory.

The navigation system 43 is operative to:

calculate the current exact location of the controlled vehicle based on radio signals transmitted from global positioning systems (GPS) and the electronic map image data stored in the memory;

display the current vehicle's exact location on the screen of a display device together with the readout electronic map image data associated with the vehicle's exact location;

calculate the best route to occupant's destination from the current location according to occupant's instructions; and give an occupant(s) voice or visual guidance to the destination along the calculated best route using the display device and/or a speaker.

The map image data includes road information. The road information includes the types of roads, such as motorways, urban areas, residential blocks, suburban areas, and so on. The road information also includes the number of lanes in each road. When receiving a request to send the road information via the CAN bus 3, the navigation system 43 is operative to send, to the source of the request, the road information in digital format (CAN format).

The yaw rate sensor 45 is operative to periodically or continuously measure, as a yaw rate, the rate of rotation about a vertical axis that passes through the controlled vehicle's center of gravity, and to output, to the leveling computer 10A, a signal indicative of the measured yaw rate in digital format (CAN format).

The steering sensor 47 is operative to periodically or continuously measure an angular displacement of, for example, front wheels of the controlled vehicle. Specifically, the steering sensor 47 is operative to measure an angular displacement of a steering wheel operated by the driver. The steering sensor 47 is operative to send, to the leveling computer 10A, information indicative of the angular displacement of the steering wheel in digital format (CAN format).

The light-source detector 51 is computer-based circuit consisting of, for example, a CPU, a rewritable ROM, a RAM, and peripherals. The light-source detector 51 is operative to receive the plurality of images picked up by the monitor camera 41, the vehicle speed detected by the vehicle speed sensor 17, and the signal indicative of the yaw rate sent from the yaw rate sensor 45.

The light-source detector 51 is also operative to determine which light-source corresponds to a pattern of incoming light contained in at least one of the plurality of picked-up images.

Figure 8:
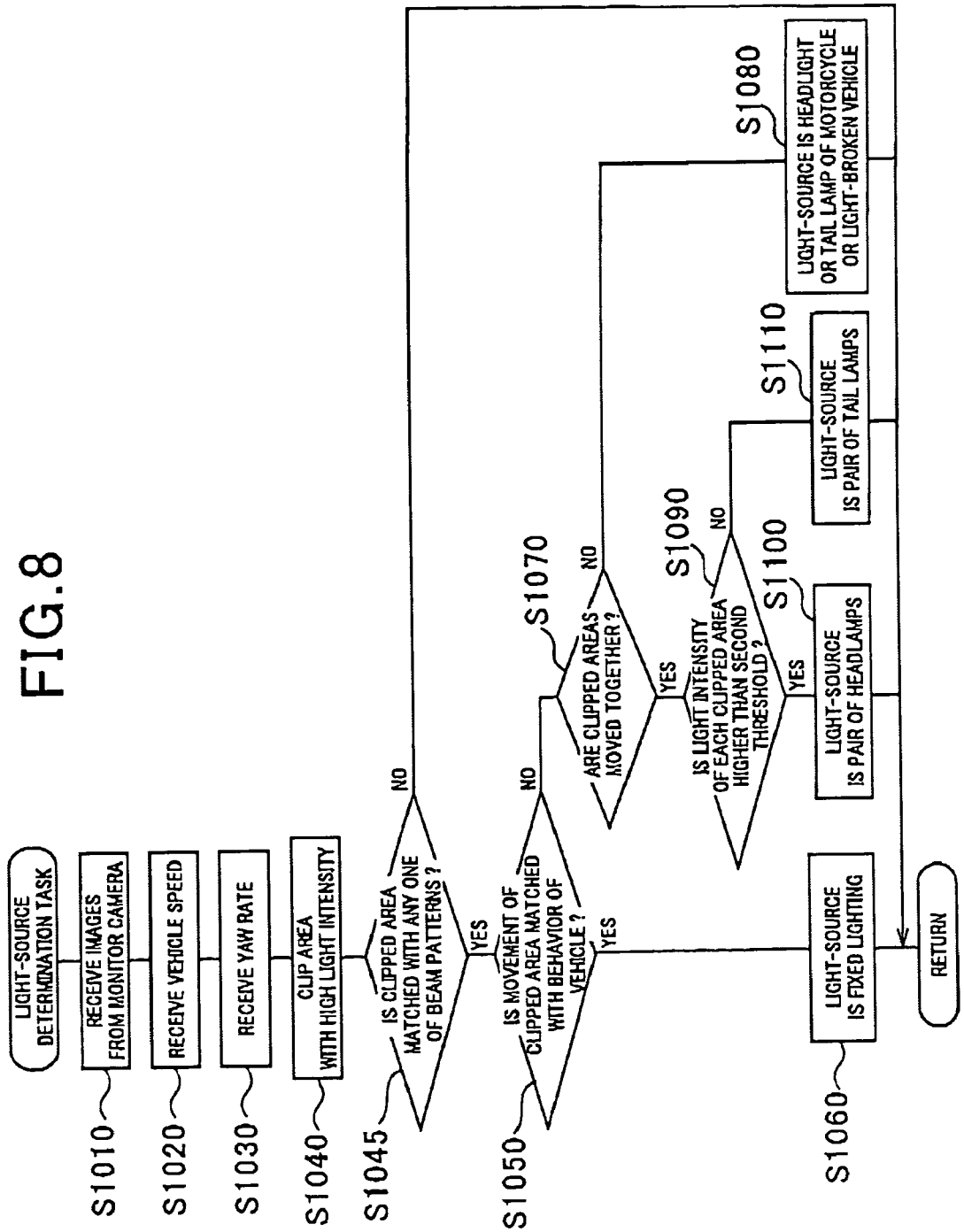
FIG. 8 is a flowchart schematically illustrating an example of a light-source determination task to be executed by a light-source detector 51 illustrated in FIG. 7.

FIG. 8 schematically illustrates an example of the light-source determination task to be executed by the light-source detector 51.

Note that the light-source determination task is launched every time an ignition switch of the controlled vehicle is turned on so that the engine is started, and the light-source determination task is terminated when the ignition switch of the controlled vehicle is turned off so that the engine is stopped.

When the light-source determination task is launched, the light-source detector 51 receives the plurality of images picked up by the monitor camera 41 in step S1010, and receives the vehicle speed detected by the vehicle speed sensor 17 in step S1020.

In parallel with the operations in steps S1010 and S1020, the light-source detector 51 receives the signal indicative of the yaw rate sent from the yaw rate sensor 45 in step S1030.

Next, the light-source detector 51 clips at least one area from some of the picked up images; each pixel of this at least one area has a light intensity higher than a predetermined first threshold value in step S1040.

In the second embodiment, a plurality of light beam patterns that can be transmitted from various types of light sources have been stored in, for example, the ROM of the light-source detector 51. The various types of light sources include various types of headlights for motor vehicles and motorcycles, various types of tail lamps for motor vehicles and motorcycles, various types of lightings placed on roadsides, and so on.

Specifically, the light-source detector 51 determines whether the at least one clipped area is substantially matched with any one of the light beam patterns stored in the ROM in step S1045.

When it is determined that the at least one clipped area is mismatched with all of the light beam patterns stored in the ROM (the determination in step S1045 is NO), the light-source determiner 51 returns to step S1010 and repeats the operations in steps S1010 to S1045.

Otherwise, when it is determined that the at least one clipped area is substantially matched with any one of the light beam patterns stored in the ROM (the determination in step S1045 is YES), the light-source detector 51 determined that at least one light-source is located ahead of the controlled vehicle, proceeding to step S1050.

In step S1050, the light-source detector 51 determines whether the movement of the at least one clipped area in some of the images is substantially matched with the behavior of the controlled vehicle based on the vehicle speed and/or the yaw rate.

When it is determined that the movement of the at least one clipped area in some of the images is substantially matched with the behavior of the controlled vehicle (the determination in step S1050 is YES), the light-source detector 51 determines that the light source corresponding to the incoming light pattern contained in at least one of the plurality of picked-up images is a lighting placed on a roadside, such as a street lighting. Then, the light-source determiner 51 stores the result of light-source determination in, for example, the RAM in step S1060, returning to step S1010 and repeats the operations in steps S1010 to S1045.

Otherwise, when it is determined that the movement of the at least one clipped area in some of the images is mismatched with the behavior of the controlled vehicle (the determination in step S1050 is NO), the light-source detector 51 proceeds to step S1070.

In step S1070, the light-source detector 51 determines whether paired clipped areas are moved together.

When it is determined that the paired clipped areas are not moved together (the determination in step S1070 is NO), the light-source detector 51 determines that the light source corresponding to the incoming light pattern contained in at least one of the plurality of picked-up images is a headlight or tail lamp of motorcycles or is one headlight or one tail lamp of motor vehicles, the other headlight or tail lamp of which is out of order so that it is not turned on. Then, the light-source detector 51 stores the result of light-source determination in, for example, the RAM in step S1080, returning to step S1010 and repeats the operations in steps S1010 to S1045.

Otherwise, when it is determined that the paired clipped areas are moved together (the determination in step S1070 is YES), the light-source detector 51 proceeds to step S1090.

In step S1090, the light-source detector 51 determines whether each of the paired clipped areas has a light intensity higher than a predetermined second threshold value. The second threshold value is set in light intensity between common headlights for motor vehicles and common tail lamps therefor.

When it is determined that each of the paired clipped areas has a light intensity higher than the second threshold value (the determination in step S1090 is YES), the light-source detector 51 determines that the light source corresponding to the incoming light pattern contained in at least one of the plurality of picked-up images is a pair of headlights of another vehicle ahead of the controlled vehicle. Then, the light-source detector 51 stores the result of light-source determination in, for example, the RAM in step S1100, returning to step S1010 and repeats the operations in steps S1010 to S1045.

Otherwise, when it is determined that each of the paired clipped areas does not have a light intensity higher than the second threshold value (the determination in step S1090 is NO), the light-source detector 51 determines that the light source corresponding to the incoming light pattern contained in at least one of the plurality of picked-up images is a pair of tail lamps of another vehicle ahead of the controlled vehicle. Then, the light-source detector 51 stores the result of light-source determination in, for example, the RAM in step S1110, returning to step S1010 and repeats the operations in steps S1010 to S1045.

As a result, in the RAM of the light-source detector 51, information indicative of the light-source determination detected by the light-source detector 51 is stored.

The lane detector 53 is operative to receive the plurality of images picked up by the monitor camera 41, to detect painted lane markings, such as white lane markings based on the received images, and to determine which lane the controlled vehicle is running on based on the positions of the detected painted lanes.

Like the distance detector 19, the light-source detector 51 is operative to send, to the leveling computer 10A via the CAN bus 3, information of the light-source determination, and the lane detector 53 is operative to send, to the leveling computer 10A, information of the running-lane determination in digital format (CAN format).

The leveling computer 10A is designed to be substantially equivalent to the leveling computer 10 except for the following points.

Specifically, the leveling computer 10A is programmed to sensitively determine which driving mode the controlled vehicle operates in based on pieces of information detected by the detectors 15, 17, 19, 43, 45, 47, 51, and 53.

In the second embodiment, the controlled vehicle can operate in any one of a plurality of driving modes of the controlled vehicle; these driving modes include town mode, normal mode, motorway mode, turning mode, passing mode, overtaking mode, and stopping mode.

The town mode and the normal mode have been described in the first embodiment.

The motorway mode represents a driving scene in which the controlled vehicle is estimated to be running in a motorway.

The turning mode represents a driving scene in which the controlled vehicle is estimated to be turning.

The passing mode represents a driving scene in which the controlled vehicle is estimated to be passing an oncoming vehicle.

The overtaking mode represents a driving scene in which the controlled vehicle is estimated to be overtaking a preceding vehicle.

The stopping mode represents a driving scene in which the controlled vehicle is estimated to be stopping.

Next, a leveling task (target angle determination task) to be executed by the leveling computer 10A will be described hereinafter in detail with reference to FIGS. 9 and 10. For example, a leveling program installed in, for example, the ROM of the leveling computer 10A causes the CPU thereof to execute the leveling task.

Note that the leveling program is launched every time an ignition switch of the controlled vehicle is turned on so that the engine is started, and the leveling program is terminated when the ignition switch of the controlled vehicle is turned off so that the engine is stopped. In addition, note that, when the leveling program is launched, the driving mode is set to the normal mode as the default driving mode.

When the leveling program is launched, the leveling computer 10A executes a driving-mode determination subroutine for determining which driving mode the controlled vehicle currently operates in step S510 of FIG. 9.

Specifically, when starting the driving-mode determination subroutine, as illustrated in FIG. 10, the leveling computer 10A executes operations in steps S700 to S775 based on pieces of information detected by the detectors 15, 17, 19, 43, 45, 47, 51, and 53 to thereby detect driving conditions of the controlled vehicle.

The leveling computer 10A determines whether the distance between the controlled vehicle and a target vehicle in step S700.

When no information is sent from the distance sensor 19, the leveling computer 10A determines that there are no preceding vehicles and no oncoming vehicles in the predetermined region to be monitored by the monitor camera 41 ahead of the controlled vehicle (the determination in step S700 is NO). Then, the leveling computer 10A sends, to the controller 21 of each of the headlights 20, an instruction indicative of the first predetermined angle θr1 as the first target angle and of the second predetermined reference angle θr2 as the second target angle in step S705. Thereafter, the leveling computer 10A returns to step S700 and repeats the determination in step S700.

When receiving the instruction, the controller 21 of each of the headlights 20 rotatably drives the vertical swing motor 23 to thereby adjust the direction of the optical axis OX of a corresponding one of the headlights 20 in the vertical direction to the first reference angle θr1. Similarly, the controller 21 of each of the headlights 20 rotatably drives the horizontal swivel motor 25 to thereby adjust the direction of the optical axis OX of a corresponding one of the headlights 20 in the horizontal direction to the second reference angle θr2 (second target angle).

As a result, the light beam transmitted from each of the headlights 20 serves as a high beam with a narrow width in the horizontal direction (see FIGS. 4 and 5A) so as to have longer and narrower light distributions to increase the driver's visibility at greater distances.

Otherwise, when a detected value is sent from the distance sensor 19, the leveling computer 10A determines that there is a preceding vehicle and/or an oncoming vehicle ahead of the controlled vehicle (the determination in step S700 is YES). Then, the leveling computer 10A receives the detected value of the distance between the controlled vehicle and a target vehicle in step S710, and receives the measured value of the vehicle speed from the vehicle speed sensor 17 in step S720.

The leveling computer 10A receives the information indicative of the angular displacement of the steering wheel sent from the steering sensor 47 in step S730, and receives the signal indicative of the measured yaw rate outputted from the yaw rate sensor 45.

The leveling computer 10A receives the information of the light-source determination sent from the light-source detector 51 in step S750, and receives the information of the running-lane determination sent from the lane detector 53 in step S760.

The leveling computer 10A sends, to the navigation system 43, a request to send the road information via the CAN bus 3, and receives the road information sent from the navigation system 43 in step S770.

Next, the leveling computer 10A detects, based on the received information of the light-source determination and the received information of the running-lane determination, a lane on which a light-source whose incoming light pattern is contained in at least one of the plurality of images picked up by the monitor camera 41 is located in step S775.

Next, the leveling computer 10A executes operations in steps S780 to S900 based on the driving conditions detected by the operations in steps S710 to S775 to thereby determine which driving mode corresponds to the detected driving conditions of the controlled vehicle.

Specifically, in step S780, the leveling computer 10A determines whether the detected steering angle is equal to or greater than a predetermined threshold value and whether the detected yaw rate is equal to or greater than a predetermined threshold value in step S780.

When it is determined that any one of the steering angle and the yaw rate is equal to or greater than the corresponding threshold value (the determination in step S780 is YES), the leveling computer 10A determines that the current driving mode of the controlled vehicle is the turning mode in step S790. Thereafter, the leveling computer 10A terminates the subroutine, returning to step S520.

Otherwise, when it is determined that none of the steering angle and the yaw rate is equal to or greater than the corresponding threshold value (the determination in step S780 is NO), the leveling computer 10A determines, in step S800, whether:

the lane position of the light-source detected by the previously executed subroutine is a right lane with respect to the lane on which the controlled vehicle is located (first condition);

the light-source determination detected by the previously executed subroutine represents a headlight (second condition); and the light-source determination detected by the currently executed subroutine represents no light sources (third condition).

When it is determined that all of the first to third conditions are met (the determination in step S800 is YES), the leveling computer 10A determines that the current driving mode of the controlled vehicle is the passing mode in step S810. Thereafter, the leveling computer 10A terminates the subroutine, returning to step S520.

Otherwise, when it is determined that at least one of the first to third conditions is not met (the determination in step S800 is NO), the leveling computer 10A proceeds to step S820.

In step S820, the leveling computer 10A determines whether:

the lane position of the light-source detected by the previously executed subroutine is a left lane with respect to the lane on which the controlled vehicle is located (first condition);

the light-source determination detected by the previously executed subroutine represents a tail lamp (second condition); and the light-source determination detected by the currently executed subroutine represents no light sources (third condition).

When it is determined that all of the first to third conditions are met (the determination in step S820 is YES), the leveling computer 10A determines that the current driving mode of the controlled vehicle is the overtaking mode in step S830. Thereafter, the leveling computer 10A terminates the subroutine, returning to step S520.

Otherwise, when it is determined that at least one of the first to third conditions is not met, the leveling computer 10A further determines whether:

the light-source determination detected by the currently executed subroutine represents no light sources (third condition) and three seconds have passed since the current driving mode is the overtaking mode by the previously executed subroutine (fourth condition).

When it is determined that the third and fourth conditions are met (the determination in step S820 is YES), the leveling computer 10A determines that the current driving mode of the controlled vehicle is the overtaking mode in step S830. Thereafter, the leveling computer 10A terminates the subroutine, returning to step S520.

Otherwise, when it is determined that at least one of the third and fourth conditions is not met (the determination in step S820 is NO), the leveling computer 10A proceeds to step S840.

In step S840, the leveling computer 10A determines whether:

the lane position of the light-source detected by the currently executed subroutine is the same lane as the controlled vehicle (first condition);

the light-source determination detected by the currently executed subroutine represents a tail lamp (second condition); and the vehicle speed detected by the currently executed subroutine is less than a predetermined threshold value (third condition).

When it is determined that all of the first to third conditions are met (the determination in step S840 is YES), the leveling computer 10A determines that the current driving mode of the controlled vehicle is the stopping mode in step S850. Thereafter, the leveling computer 10A terminates the subroutine, returning to step S520.

Otherwise, when it is determined that at least one of the first to third conditions is not met (the determination in step S840 is NO), the leveling computer 10A proceeds to step S860.

In step S860, the leveling computer 10A determines whether:

the type of the road on which the controlled vehicle is currently running is "motorways" or the vehicle speed is equal to or greater than the predetermined threshold value (first condition); and the detected value of the distance between the controlled vehicle and a target vehicle is equal to or greater than a predetermined threshold value (second condition).

When it is determined that all of the first and second conditions are met (the determination in step S860 is YES), the leveling computer 10A determines that the current driving mode of the controlled vehicle is the motorway mode in step S870. Thereafter, the leveling computer 10A terminates the subroutine, returning to step S520.

Otherwise, when it is determined that at least one of the first and second conditions is not met (the determination in step S860 is NO), the leveling computer 10A proceeds to step S880.

In step S880, the leveling computer 10A determines whether:

the type of the road on which the controlled vehicle is currently running is "urban areas" or the vehicle speed is less than the predetermined threshold value (first condition); and the detected value of the distance between the controlled vehicle and a target vehicle is less than the predetermined threshold value (second condition).

When it is determined that all of the first and second conditions are met (the determination in step S880 is YES), the leveling computer 10A determines that the current driving mode of the controlled vehicle is the town mode in step S890. Thereafter, the leveling computer 10A terminates the subroutine, returning to step S520.

Otherwise, when it is determined that at least one of the first and second conditions is not met (the determination in step S880 is NO), the leveling computer 10A determines that the current driving mode of the controlled vehicle is the normal mode in step S900. Thereafter, the leveling computer 10A terminates the subroutine, returning to step S520.

In step S520, the leveling computer 10A receives the values of the distance between the controlled vehicle and a target vehicle that have been detected by the distance detector 19 over one second. The values of the distance between the controlled vehicle and a target vehicle that have been detected by the distance detector 19 over one second are stored in, for example, the RAM of the leveling computer 10A.

Next, the leveling computer 10A executes a filtering task based on the received values (samples) of the distance between the controlled vehicle and a target vehicle that have been detected by the distance detector 19 over one second in step S530. Specifically, in step S530, the leveling computer 10A averages the received values of the distance between the controlled vehicle and a target vehicle that have been detected by the distance detector 19 over one second.

This can prevent the optical axis OX of each of the headlights 20 from oscillating when the distance between the controlled vehicle and a target vehicle cannot be instantaneously detected.

Next, the leveling computer 10A determines which driving mode is set to the current driving mode of the controlled vehicle in step S540.

When it is determined that the turning mode is set to the current driving mode of the controlled vehicle ("turning mode" in step S540), the leveling computer 10A keeps the vertical irradiation angle unchanged in step S550. This allows the adjustment of the optical axis OX in the vertical direction to be limited when the controlled vehicle is turning, for example, a corner.

When it is determined that the passing mode is set to the current driving mode of the controlled vehicle ("passing mode" in step S540), the leveling computer 10A disables the filtering task by, for example, deleting the values of the distance between the controlled vehicle and a target vehicle that have been detected by the distance detector 19 over one second stored in the RAM of the leveling computer 10A in step S560.

This allows the first and second target angles of the optical axis OX of each of the headlights 20 to be computed based on the currently detected distance between the controlled vehicle and target vehicle, making it possible to reduce the time required to change the direction of the optical axis OX of each of the headlights 20.

When it is determined that the overtaking mode is set to the current driving mode of the controlled vehicle ("overtaking mode" in step S540), the leveling computer 10A keeps the vertical irradiation angle unchanged in step S570. This allows the adjustment of the optical axis OX in the vertical direction to be limited when the controlled vehicle is turning, for example, a corner.

When it is determined that the stopping mode is set to the current driving mode of the controlled vehicle ("stopping mode" in step S540), the leveling computer 10A sets the target gradient Y (the first target angle) to the lower limit of −2.0 [%] in step S580.

This allows the driver's visibility at closer distances to increase.

When it is determined that the motorway mode is set to the current driving mode of the controlled vehicle ("motorway mode" in step S540), the leveling computer 10A changes the reference gradient A so as to match the changed value of the reference gradient A, such as −1.0 [%], with the motorway mode to thereby change the reference target height rh and the height of a target corresponding thereto based on the changed value of the reference gradient A in step S590.

Thereafter, the leveling computer 10A computes the target gradient Y of the optical axis OX of each of the headlights 20 in the vertical direction based on the equation [3], the changed reference gradient A, and the received distance between the controlled vehicle and a target vehicle so as to pass the optical axis OX of each of the headlights 20 through the target in step S600.

When it is determined that the town mode is set to the current driving mode of the controlled vehicle ("town mode" in step S540), the leveling computer 10A changes the reference gradient A so as to match the changed value of the reference gradient A, such as −1.5 [%], with the town mode to thereby change the reference target height rh and the height of a target corresponding thereto based on the changed value of the reference gradient A in step S610.

Thereafter, the leveling computer 10A computes the target gradient Y of the optical axis OX of each of the headlights 20 in the vertical direction based on the equation [3], the changed reference gradient A, and the received distance between the controlled vehicle and a target vehicle so as to pass the optical axis OX of each of the headlights 20 through the target in step S620.

When it is determined that the normal mode is set to the current driving mode of the controlled vehicle ("normal mode" in step S540), the leveling computer 10A changes the reference gradient A so as to match the changed value of the reference gradient A, such as −1.2 [%], with the normal mode to thereby change the reference target height rh and the height of a target corresponding thereto based on the changed value of the reference gradient A in step S630.

Thereafter, the leveling computer 10A computes the target gradient Y of the optical axis OX of each of the headlights 20 in the vertical direction based on the equation [3], the changed reference gradient A, and the received distance between the controlled vehicle and a target vehicle so as to pass the optical axis OX of each of the headlights 20 through the target in step S640.

When the operation in any one of step S550, S560, S570, S580, S600, S620, and S640 has been completed, the leveling computer 10A proceeds to step S650.

In step S650, the leveling computer 10A sends, to the controller 21 of each of the headlights 20, the computed target gradient Y as the first target angle and the computed swiveling angle W as the second target angle based on the result of execution of the operation in a corresponding one of steps S550, S560, S570, S580, S600, S620, and S640.

Thereafter, the leveling computer 10 returns to step S510 and repeats the operations in steps S510 to S650 until the ignition switch is turned off.

As described above, the headlight control system 2 according to the second embodiment is designed to adjust the optical axis OX of each headlight 20, that is, the light beam produced by each headlight 20, depending on which driving mode the controlled vehicle operates in.

Specifically, the driver's visibility required to safely drive the controlled vehicle is adjusted with change in the driving mode.

For example, when the controlled vehicle is turning a corner, it is necessary for the driver to continuously watch the circumstances around the corner.

In this case, the headlight control system 2 is configured to keep the light beam produced by each headlight 20 unchanged in the vertical direction, making it possible for the driver to easily continue to watch the circumstances around the corner.

In addition, when the controlled vehicle is running a motorway, it is necessary to increase the driver's visibility at greater distances.

In this case, the headlight control system 2 is configured to change the height of a target and change the first and second target angles so that the light beam produced by each headlight 20 has longer and narrower light distributions. This makes it possible to increase the driver's visibility at greater distances.

In addition, the headlight control system 2 is configured to average the received values of the distance between the controlled vehicle and a target vehicle that have been detected by the distance detector 19. The headlight control system 2 is configured to adjust the direction of the light beam produced by each headlight 20 based on the averaged value of the distance.

This can avoid frequent and grate changes in the direction of the light beam produced by each headlight 20, and prevent the light beam from oscillating when the distance between the controlled vehicle and a target vehicle cannot be instantaneously detected.

In addition, the averaging of the received values of the distance between the controlled vehicle and a target vehicle allows noise contained in the received values during measurement to be reduced.

The light control system 2 also disables the execution of the averaging process set forth above in accordance with which driving mode (driving scene) the controlled vehicle operates in. This makes it possible to reduce the time required to change the direction of the optical axis OX of each of the headlights 20 when the current driving mode (driving scene) requires the adjustment of the direction of the optical axis OX of each of the headlights 20 as soon as possible.

The light control system 2 is further configured to limit the adjustment of the direction of the optical axis OX of each headlight 20 in accordance with which driving mode (driving scene) the controlled vehicle operates in. This makes it possible to omit the adjustment of the direction of the optical axis OX of each headlight 20 when the headlight-beam direction adjustment is unnecessary depending on which driving mode (driving scene) the controlled vehicle operates in.

In each of the first and second embodiments and their modifications set forth above, the headlight control system is configured to determine a height of a target with respect to the height of each headlight 20 or with respect to a part of the road surface on which the controlled vehicle is running. The present invention is not limited to the structure.

Specifically, the headlight control system can be configured to determine the height of a target with respect to another part of the road surface or another road surface on which a target vehicle, such as a preceding vehicle or an oncoming vehicle is running.

In each of the first and second embodiments and their modifications set forth above, the leveling computer is configured to compute the first and second target angles, and the controller 21 of each headlight 20 is configured to compute the angular difference (relative angle) between the actual vertical irradiation angle and the first target angle, and that between the actual horizontal irradiation angle and the second target angle. The present invention is however not limited to the configuration.

Specifically, the leveling computer can be configured to compute the angular difference between the actual vertical irradiation angle and the first target angle, and compute the angular difference between the actual horizontal irradiation angle and the second target angle. This allows the functional structure (software structure) of the controller 21 of each headlight 20 to be simplified.

In each of the first and second embodiments and their modifications set forth above, variation in the height of each headlight 20 being mounted on a corresponding one side of the front end of the controlled vehicle is not taken into consideration.

The headlight control system can be however designed to determine the height of a target while taking it into consideration that the height of each headlight 20 being mounted on a corresponding one side of the front end of the controlled vehicle is varied.

In this modification, the headlight control system can detect the variation in the height of each headlight 20 being mounted on a corresponding one side of the front end of the controlled vehicle based on the tilt of the controlled vehicle detected by the tilt sensor 15, the length of the wheelbase of the controlled vehicle, and the distance between each headlight and a corresponding one of the front wheels.

In each of the first and second embodiments and their modifications set forth above, the leveling computer is programmed to compute the first target angle of the optical axis OX of each headlight 20 in the vertical direction and the second target angle (swivel angle) thereof in the horizontal direction. The present invention is however not limited to the structure.

Specifically, the leveling computer can be programmed to compute only the first target angle of the optical axis OX of each headlight 20 in the vertical direction, and the headlight control system can include a swivel computer programmed to compute the second target angle (swivel angle) of the optical axis OX of each headlight 20 in the horizontal direction.

The leveling computer 10 according to the first embodiment can be programmed to subject the received values of the distance between the controlled vehicle and a target vehicle that have been detected by the distance detector 19 to the software filtering process to thereby average them in the same manner as the leveling computer 10A according to the second embodiment.

In addition, the software filtering process can be replaced with a CR (Capacitance-Resistance) circuit composed of a capacitor and a resistor with a predetermined time constant for averaging the received samples of the distance between the controlled vehicle and a target vehicle that have been detected by the distance detector 19.

In each of the first and second embodiments and their modifications set forth above, as an example, the leveling computer is programmed to compute the target gradient of the optical axis OX of each headlight 20 in the vertical direction in accordance with the equation [3]. The leveling computer can be programmed to compute the first target angle of the optical axis OX of each headlight 20 in the vertical direction in accordance with another relational expression.

Specifically, as another example, the leveling computer can be programmed to compute the target gradient Y of the optical axis OX of each headlight 20 in the vertical direction in accordance with the following equation [5] (see FIG. 3):

$$Y[\text{degrees}]=\tan^{-1}\{(h-rh)/X\} \quad [5]$$

While there has been described what is at present considered to be the embodiments and its modifications of the present invention, it will be understood that various modifications which are not described yet may be made therein, and it is intended to cover in the appended claims all such modifications as full within the true spirit and scope of the invention.

What is claimed is:

1. A system for controlling a headlight of a vehicle to be controlled, the system comprising:
   a distance detector detecting a distance between the controlled vehicle and an other vehicle ahead thereof;
   a determiner determine determining a target located at the detected distance with respect to the controlled vehicle, and determining a first target direction for an optical axis of the headlight in a vertical direction when it is assumed that the optical axis of the headlight passes through the target located at the detected distance with respect to the controlled vehicle, the target having a predetermined height above a predetermined reference point, the predetermined height of the target being unchanged irrespective of a change in the detected distance;
   a first adjuster adjusting the direction of the optical axis of the headlight in the vertical direction so that the direction of the optical axis is matched with the determined first target direction;
   a vehicle-speed detector detecting a speed of the controlled vehicle;
   a driving condition detector detecting at least one driving condition of the controlled vehicle;

a driving mode detector detecting which driving mode the controlled vehicle operates is based on: the detected driving condition, the detected distance between the controlled vehicle and the other vehicle, and the detected speed of the controlled vehicle; and a height-adjusting unit adjusting the predetermined height of the target based on the detected driving mode of the controlled vehicle, wherein the determiner changes the first target direction for the optical axis of the headlight in the vertical direction so that the first adjuster adjusts the optical axis of the headlamp to be matched with the changed first target direction.

2. A system according to claim 1, wherein the height-adjusting unit reduces the predetermined height of the target with a reduction in the detected speed of the vehicle and increases the predetermined height of the target with an increase in the detected speed of the vehicle.

3. A system according to claim 1, wherein the distance detector repeatedly samples the distance between the controlled vehicle and the other vehicle ahead thereof, further comprising:

an averaging unit averages a plurality of the detected samples of the distance over a predetermined period of time so as to obtain an averaged value of the distance, and wherein the determiner determines the first target direction for the optical axis of the headlight in the vertical direction when it is assumed that the optical axis of the headlight passes through the target located at the averaged value of the distance with respect to the controlled vehicle.

4. A system according to claim 1, further comprising:

an averaging unit averaging a plurality of the detected samples of the distance over a predetermined period of time so as to obtain an averaged value of the distance; and a limit determining unit determining whether to limit the averaging of the detected samples of the distance by the averaging unit according to the detected driving mode of the controlled vehicle.

5. A system according to claim 1, further comprising:

a driving condition detector detecting at least one driving condition of the controlled vehicle;

a driving mode detector detecting which driving mode the controlled vehicle operates in based on the detected driving condition; and a limit determining unit determining whether to limit the adjusting of the direction of the optical axis of the headlight in the vertical direction by the first adjuster according to the detected driving mode of the controlled vehicle.

6. A system according to claim 1, further comprising:

a second adjuster adjusting the direction of the optical axis of the headlight in a horizontal direction in cooperation with the first adjuster.

7. A system according to claim 6, wherein the headlight consists of a pair of headlights mounted on both sides of a front end of the controlled vehicle, the determiner determines the first target direction for the optical axis of the headlight in the vertical direction when it is assumed that the optical axis of each of the paired headlights passes through a target located at the detected distance with respect to the controlled vehicle, and the first adjuster adjusts the direction of the optical axis of each of the paired headlights in the vertical direction so that the direction of the optical axis is matched with the determined first target direction, further comprising:

a second adjuster adjusting the direction of the optical axis of the headlight in a horizontal direction orthogonal to the vertical direction so as to widen a distance between the optical axis of one of the paired headlights in the horizontal direction and the optical axis of each of the paired headlight being dipped by the first adjuster in the vertical direction.

8. A system according to claim 1, wherein the at least one driving condition of the controlled vehicle includes a light source of incoming light based on a plurality of images of a predetermined region ahead of the controlled vehicle.

9. A system according to claim 1, wherein the at least one driving condition of the controlled vehicle includes a type of a road on which the controlled vehicle is running.

10. A system according to claim 1, wherein the controlled vehicle operates in one of a plurality of the driving modes, the plurality of the driving modes include a town mode, a normal mode, a motorway mode, a turning mode, a passing mode, an overtaking mode, and a stopping mode, the town mode representing a driving scene in which the controlled vehicle is estimated to be running in urban areas, the normal mode representing a driving scene in which the controlled vehicle is estimated to be running in a residential block, the turning mode representing a driving scene in which the controlled vehicle is estimated to be turning, the passing mode representing a driving scene in which the controlled vehicle is estimated to be passing an oncoming vehicle as the other vehicle, the overtaking mode representing a driving scene in which the controlled vehicle is estimated to be overtaking a preceding vehicle as the other vehicle, the stopping mode representing a driving scene in which the controlled vehicle is estimated to be stopping.

* * * * *